Sept. 5, 1961  G. E. HAGEN  2,998,912
INTERCOUPLING APPARATUS
Filed July 29, 1957  8 Sheets-Sheet 1
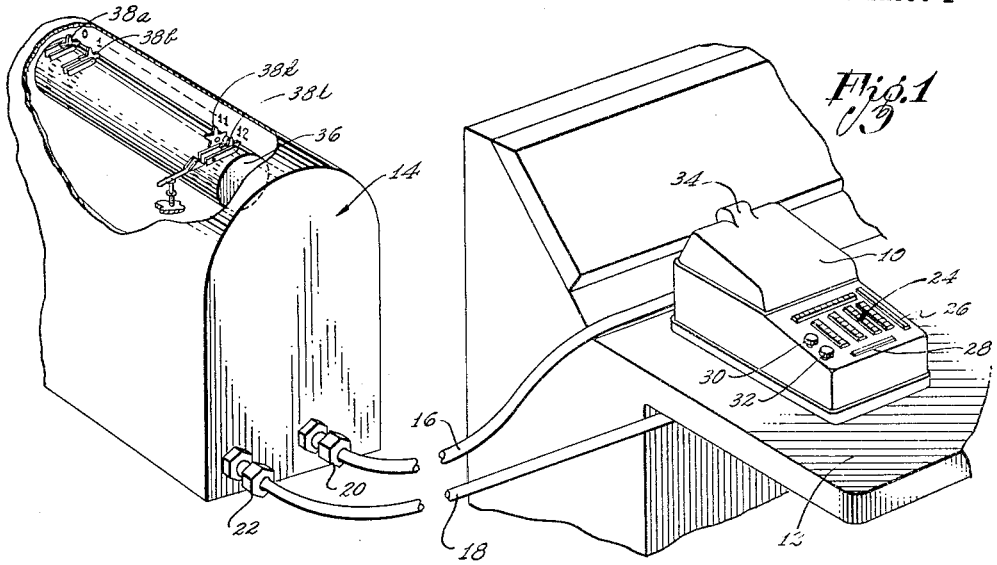
Fig. 1
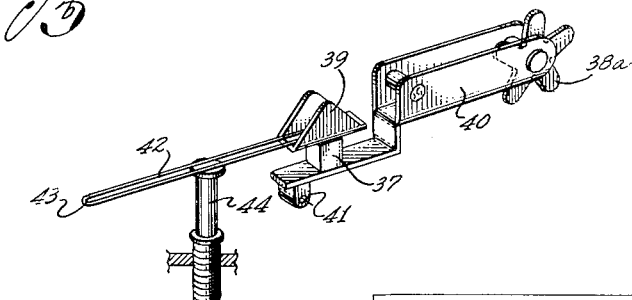
Fig. 1a
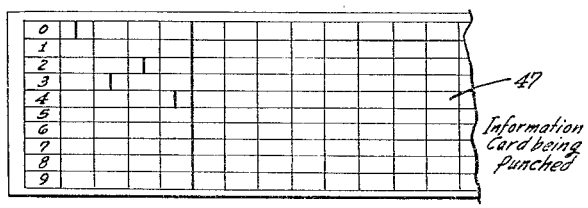
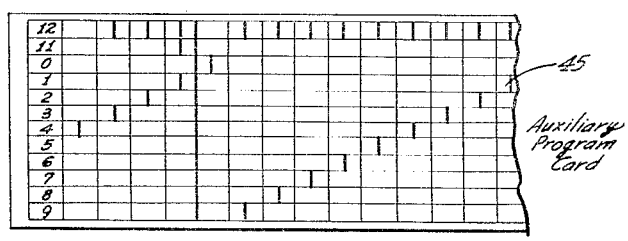
Fig. 2
INVENTOR:
Glenn E. Hagen
By Smyth & Roston
Attorneys

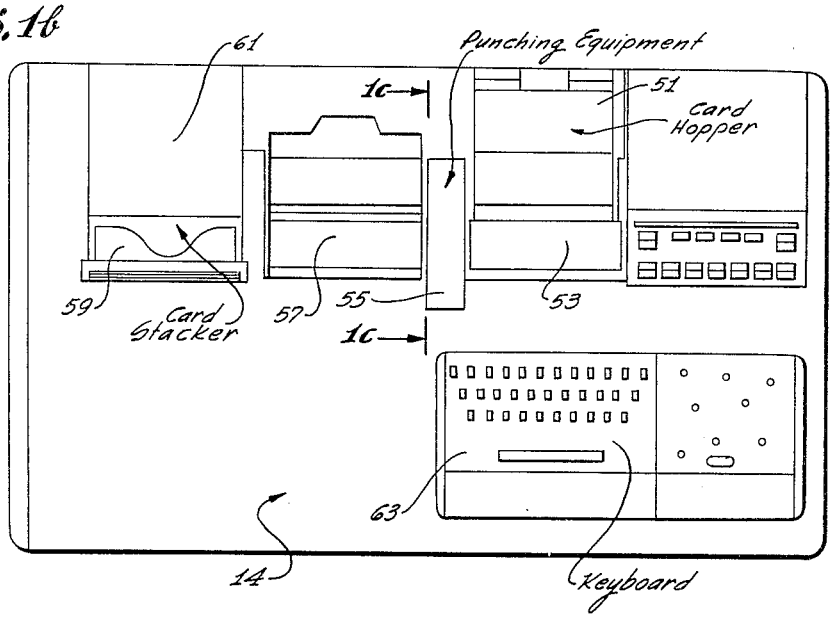
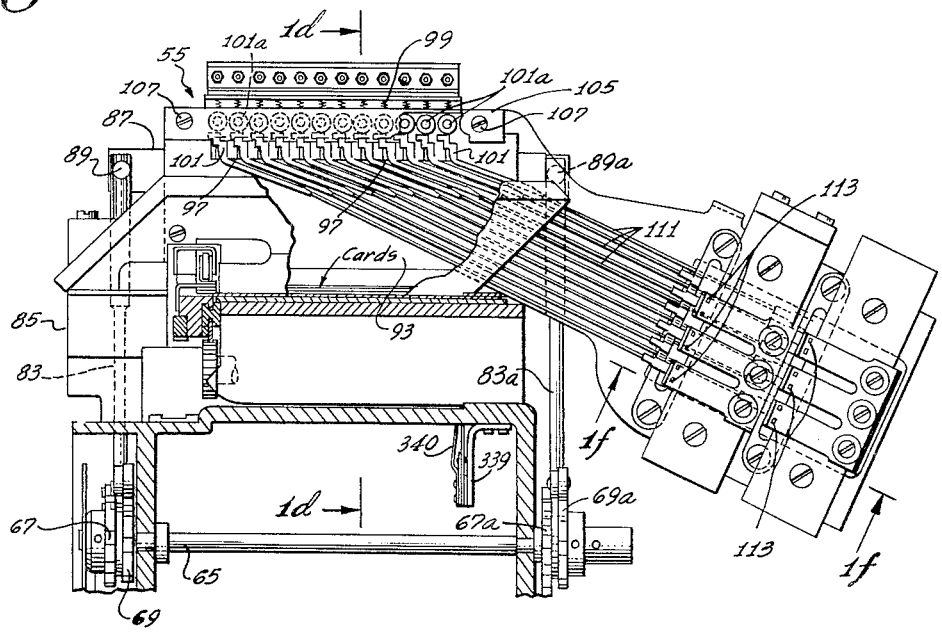

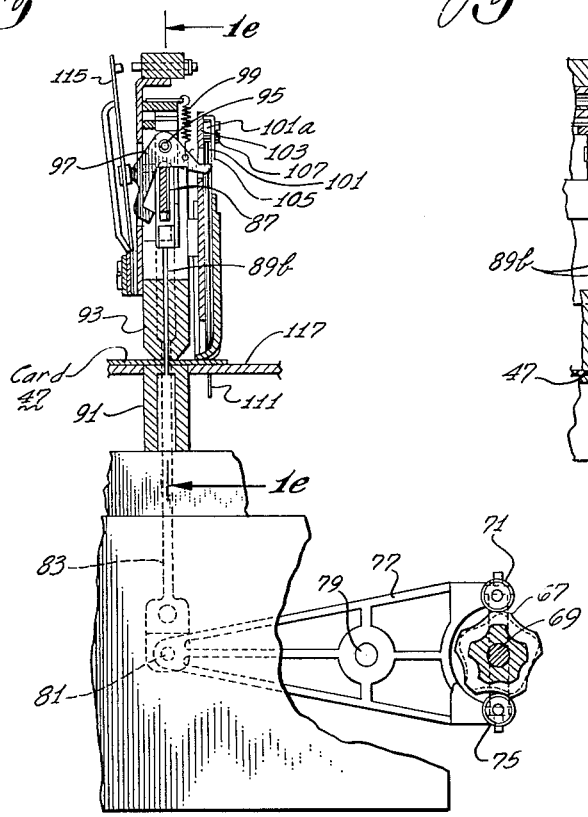
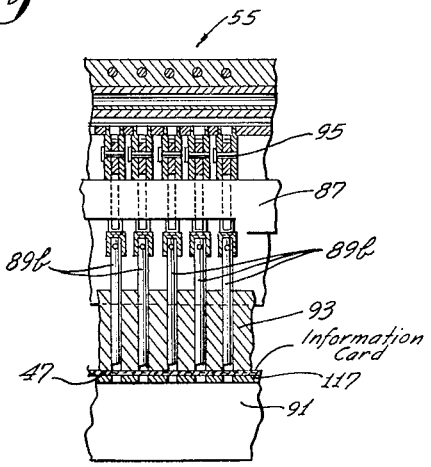
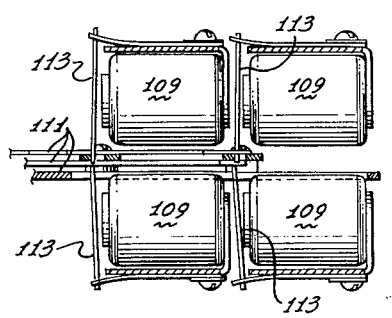

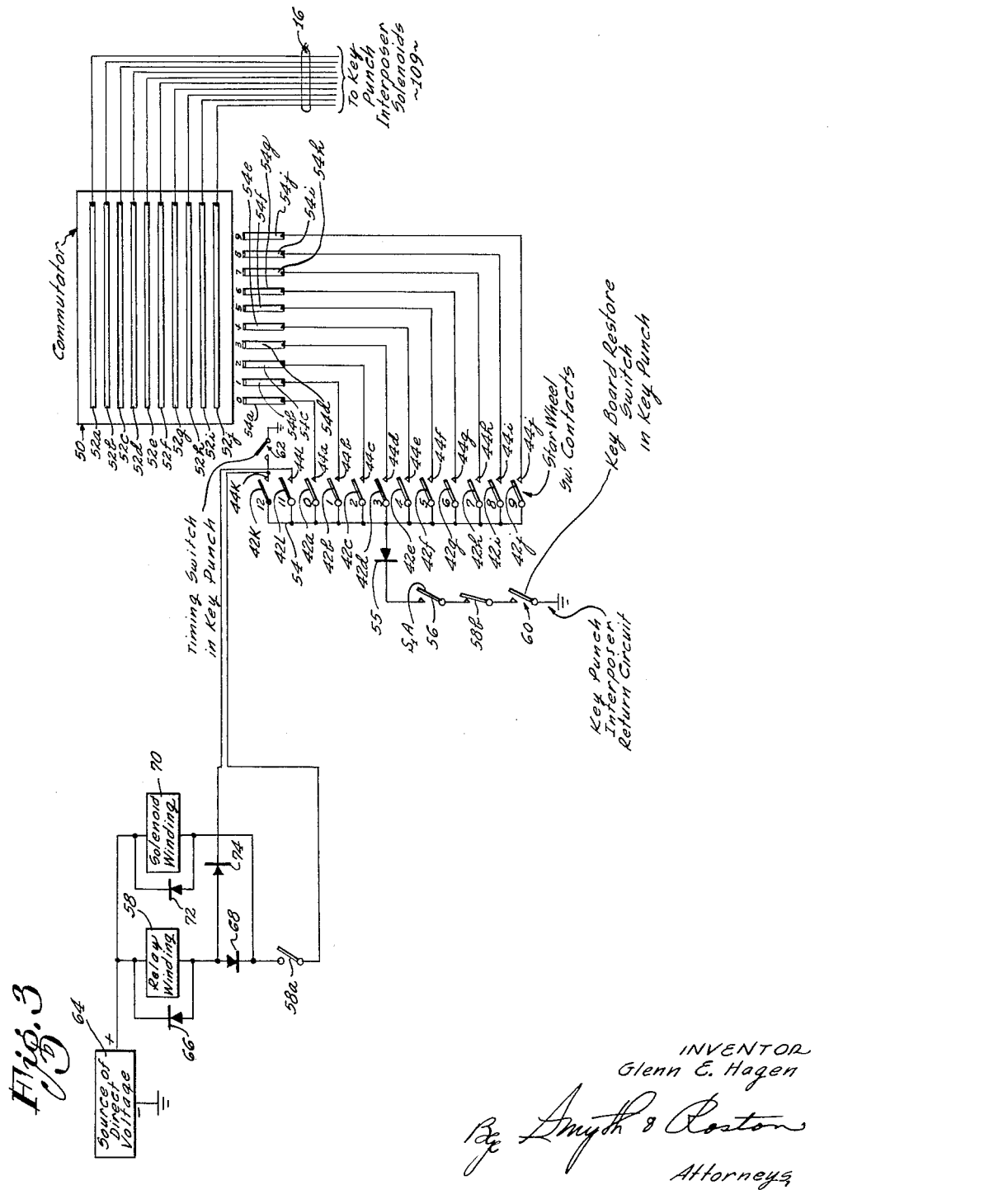

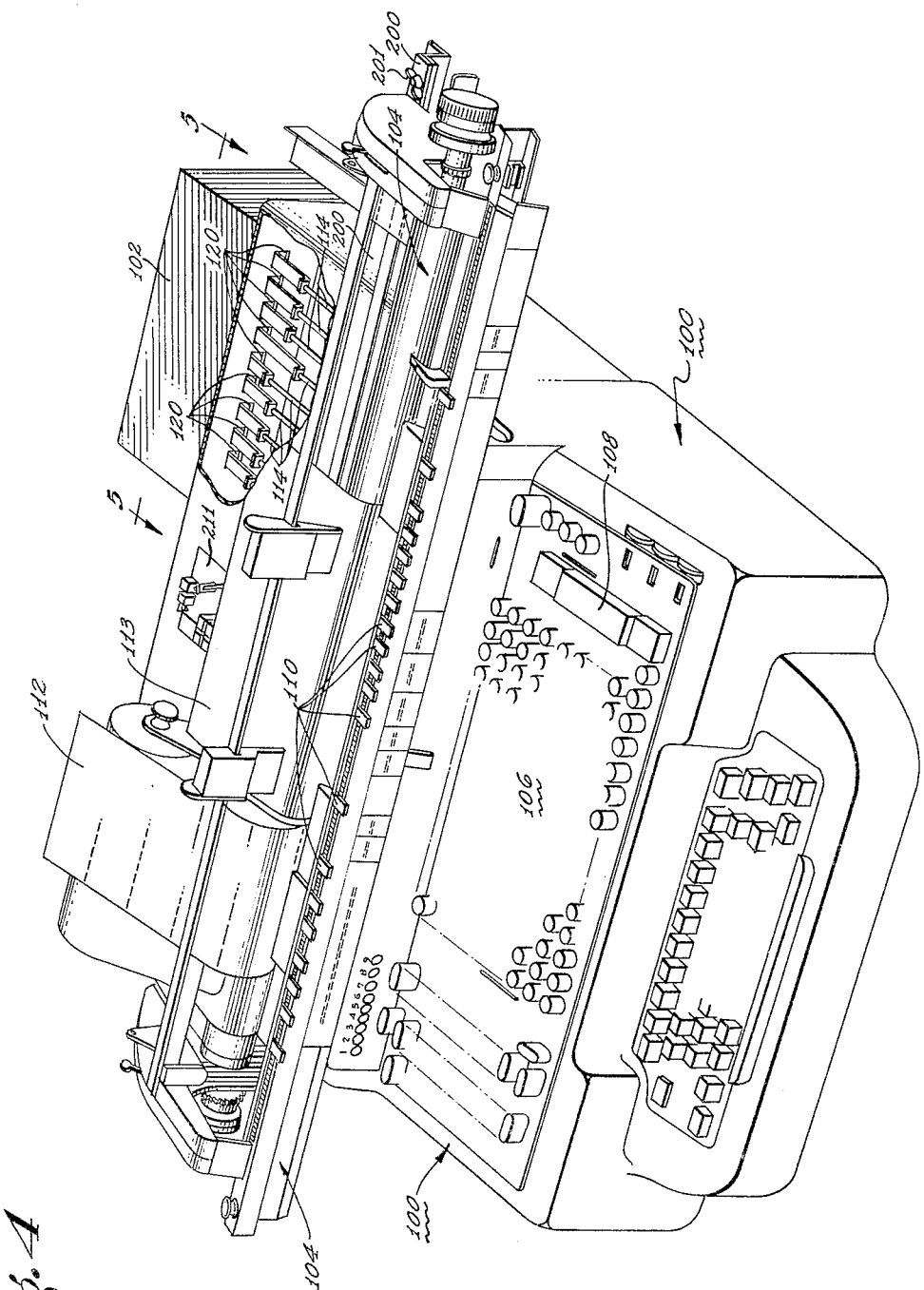

Sept. 5, 1961 G. E. HAGEN 2,998,912
INTERCOUPLING APPARATUS
Filed July 29, 1957 8 Sheets-Sheet 7

INVENTOR:
Glenn E. Hagen
By Smyth & Roston
Attorneys

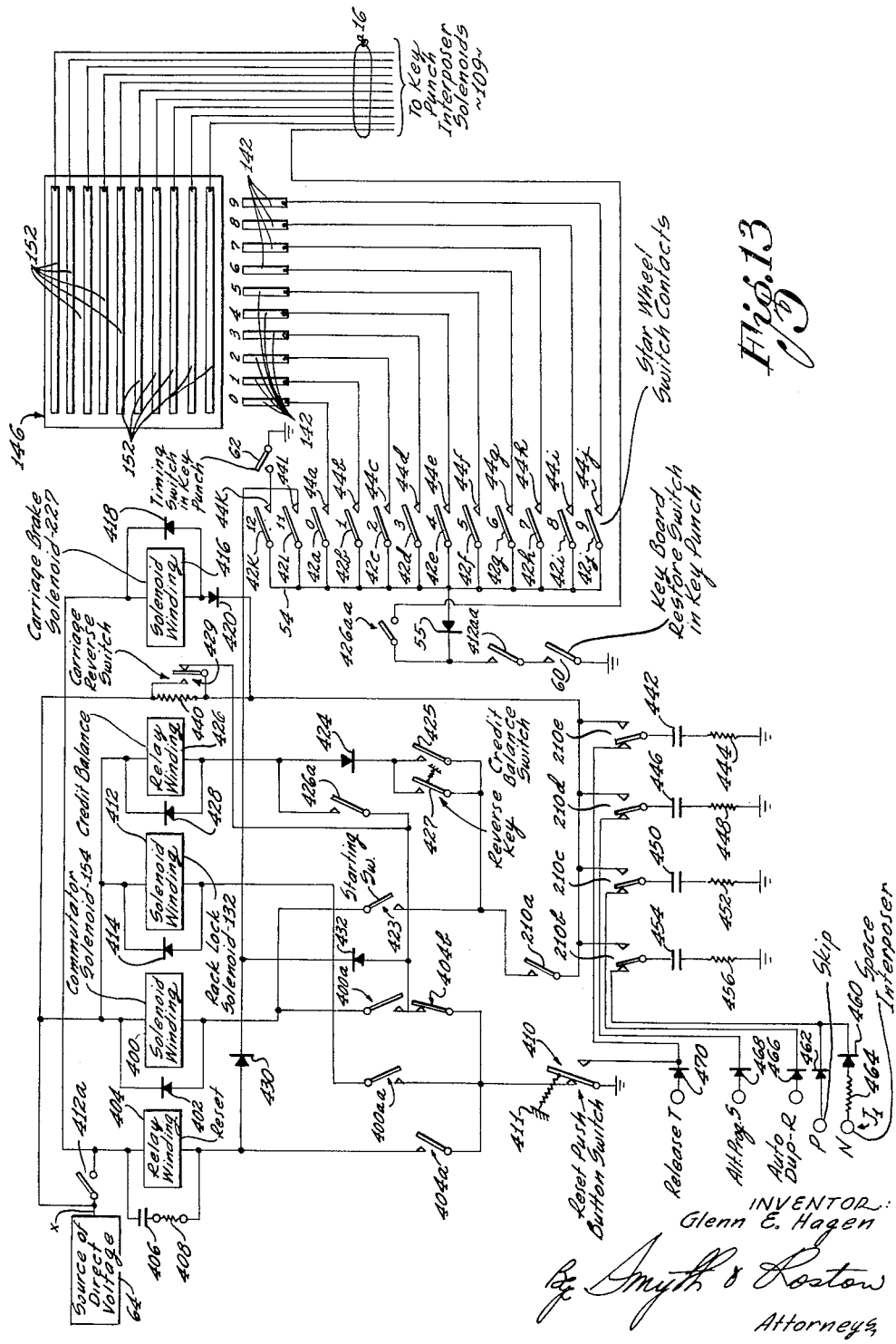

United States Patent Office 2,998,912
Patented Sept. 5, 1961

2,998,912
INTERCOUPLING APPARATUS
Glenn E. Hagen, New York, N.Y., assignor, by mesne assignments, to General Instrument Corporation, Hawthorne, Calif., a corporation of New Jersey
Filed July 29, 1957, Ser. No. 674,766
21 Claims. (Cl. 234—18)

The present invention relates to apparatus for controlling recording equipment such as a key punch machine, or the like, in a manner to record sets of data on successive information cards fed through the recording equipment.

More particularly, the invention is concerned with the modification of known types of accounting machines and with an improved system and apparatus for coupling the modified machines to known recording apparatus to control the recording apparatus in a manner to be described. In short, the invention provides equipment in which sets of data as established by the manual manipulation of the keyboard of an adding machine are transferred to a recording apparatus to be recorded on successive information cards fed through that apparatus.

Many types of automatic and semi-automatic accounting machines have been devised and built for carrying out accounting routines generally encountered in most business operations. Moreover, electronic data processing systems have been devised for this purpose.

In one type of data processing system, discrete cards are used on which significant information is recorded. This information is recorded on the cards in the form of patterns of punched holes, or in any other suitable manner. The cards are each divided into a series of what is generally termed "fields," with each field including a predetermined number of columns of bits of information corresponding to significant data recorded on the particular card. The number of such columns may vary from field to field on the various cards.

Each of the columns referred to in the preceding paragraph, may correspond, for example, to a different "position" of the card. Each such column represents, for example, a series of levels running from 0 to 9. The location of a punch or other recording indicia in the column represents, therefore, a digit in the range of from 0 to 9. Adjacent columns in each field may represent digits of varying ordinal significance, so that a desired multi-digit number may be represented by the selected pattern of punchings from one column to the next in that field.

As outlined above, one method of recording the data on the information cards is by punching the cards at selected positions in the columns included in their various fields. This punching is usually carried out by a key punch machine, and this machine is usually equipped with a suitable keyboard. In the prior art arrangements, an operator manually operated the keyboard of the key punch machine as blank cards were fed through that machine. This manual operation of the keyboard controlled the patterns in which the different columns in the fields of each card were to be punched, which patterns naturally were dictated by the particular data to be recorded on each of the cards.

Copending application Ser. No. 608,344, filed September 6, 1956, by Glenn E. Hagen discloses and claims a system and apparatus in which a simple adding machine was modified and changed so that, in addition to performing its usual adding functions, it could also be used to control automatically a card punching machine of the type described in the preceding paragraph and which is usually referred to as a "key punch."

The sets of data to be recorded on the information cards fed through the key punch were manually set up in the system of the copending application on the keyboard of the modified adding machine. This data was then translated into suitable control signals for the key punch. Then, and in a manner fully described in the copending application, the blank information cards fed through the key punch were punched in successive field patterns representative of such sets of data.

As also fully described in the copending application, the modified adding machine control of the key punch has certain important advantages. One advantage is that it enables the operator to be setting up a new set of data to be recorded while the previous set is in the process of being recorded by the key punch on an information card. This speeds up the recording process in that it tends to provide for continuous rather than intermittent operations on the part of the operator.

The present invention is also directed to an apparatus and system in which a modified accounting machine is used to control recording apparatus, such as a key punch, for recording sets of data on successive information cards. The present invention also provides a system for coupling the modified accounting machine to the key punch. This system is simplified to a large extent as compared with the system of the copending application, and it performs its desired functions and realizes its desired results with a minimum of components and associated circuitry.

The present invention further provides a simple modification for a relatively complex type of known accounting machine to adapt the machine to be readily and conveniently coupled to an existing recording machine of, for example, the key punch type.

Most accounting machines now in general use operate in a manner such that each of a series of numbers that are to be arithmetically combined is first stored in a suitable memory unit. Each number is set up in the memory unit as the operator actuates the various keys to the keyboard of the adding machine. After each number has been set up in the memory unit, the operator presses an "add" bar which is usually situated adjacent the keyboard.

The depression of the "add" bar causes the particular number in the memory unit to be transferred to a series of racks. These racks assume different individual positions corresponding to the respective digits of the number, and they are coupled to corresponding type bars which are subsequently actuated to print the number on a strip of paper. In this manner, successive numbers to be added together are printed in columnar form on the paper.

Each such number is added to the previous numbers by means of a totalizer mechanism. The manner in which the totalizer mechanism is incorporated into the adding machine and its construction are well known to the art.

The memory unit of the accounting machine is automatically cleared upon the transfer of each of the numbers to the racks. This enables the next number to be set up and stored in the memory unit at this particular point in the operational cycle of the machine. The fact that the memory unit is cleared at this point provides an advantage when the machine is adapted to control a key punch or the like. This results from the fact that this characteristic of the accounting machine enables a succeeding set of data to be set up and stored in the memory unit of the machine simultaneously with the processing of the previous set of data by the key punch. This feature tends to speed up the recording process materially because, as noted above, it allows the operator to record data on the successive information cards on a substantially continuous basis rather than on an intermittent basis.

In the system and apparatus disclosed in the copending application, a particular and relatively simple type of accounting machine is modified to incorporate additional components. These components serve to interrupt the operation of the machine at the particular point referred to above in each of its operational cycles. Also, the additional components hold the machine so interrupted until a control signal is received from the key punch indicating that the key punching operation for the previous set of data transferred to it from the adding machine has been completed. These interruptions occur at the point in the respective operational cycles of the machine at which the number stored in the memory unit is transferred to the racks. The type bars are not yet actuated at the point of interruption. But the memory unit is cleared so that the next number can be set up and stored. When the control signal is received from the key punch, the operational cycle of the machine is resumed and the type bars are actuated to print the number; the racks are returned to their reference position; the next number is transferred to them; and the cycle of operation is again interrupted and awaits the next occurrence of the control signal.

As pointed out in the copending application, the control sequence described above not only provides for essentially continuous operation of the key punch, but it also provides for a degree of flexibility in the control operation. This is because it allows the operator to proceed and even get a little ahead of the key punch at times without interfering with the proper operation of the key punch.

Also, the operator need not be concerned as to whether the key punch is behind. This is because the memory unit of the adding machine is not cleared nor is the keyboard released until it is appropriate to set up a new number. Therefore, whenever the keyboard of the accounting machine is released, the operator can proceed and set up the next number.

Another feature in the utilization of the modified adding machine control of the key punch recording apparatus is that whenever a number is erroneously set up in the memory unit of the accounting machine, the usual "clear" bar of the adding machine can be used to correct the number. This means that the erroneous number may be cleared and corrected before the wrong number is fed to the key punch. Therefore, corrections can be made before a card is improperly punched, and there is no need therefore to discard a card and all its previous correctly recorded data because of one erroneous number.

The coupling and control of the present invention is such that the smaller numbers are automatically prefixed. There is no need for the operator to prefix these numbers manually with spaces or zeros, as is the case with the manual key punch operator. This is a material factor in increasing the speed with which data can be set up by the mechanism of the invention.

In the apparatus of the copending application, resilient electrically conductive brushes were mounted directly onto the end of the above discussed racks of the accounting machine. A mechanically controlled commutator was then brought into contact with the brushes. This occurred after the racks had been established in different individual positions corresponding to the data transferred to them from the memory unit. The operating cycle of the machine was then interrupted, as noted previously.

An embodiment of the present invention (which will be described in detail) is similar in some respects to that of the copending application. However, in the embodiment of the present invention a separate unit is provided which houses a series of movable elongated rack-like members. The resilient brushes are mounted on these members in the separate unit instead of directly on the racks of the accounting machine, and the members are actuated to different individual positions by the racks in the machine itself. Means are provided for locking the movable members in the separate unit at their different individual positions until the desired information is fed to the key punch. The separate unit of the present invention also houses a commutator, and a solenoid is provided in the unit for controllably bringing the commutator into contact with the resilient brushes on the racks.

The structural details of the present invention are such that an existing accounting machine of a simple or of the more complex type may be conveniently modified for the purposes of the invention. This is achieved without unduly disturbing the internal components of the machine, and merely by mounting a self-contained adapting unit on the machine.

One of the illustrated embodiments of the invention is shown as incorporated in the more elaborate types of business machine such as the National Cash Register Class 31 accounting machine. This type of machine is capable of simultaneously adding several columns of figures, and it incorporates a movable carriage. The machine also has several well-known automatic features. The present invention in one of its aspects makes use of the movable carriage of the machine to control the key punch so as to provide a multi-field recording on the information cards successively fed to the key punch. Also the movable carriage of the accounting machine is used to achieve other desired controls of the key punch, as will be described.

As described in the copending application, the commutator in contacting the resilient brushes produces electric signals representative of the individual positions of the racks. These signals cause the key punch machine to record the data on the information cards. The data so recorded on the cards is used in known manner in data processing systems.

In the copending application a control system using rotary switches is provided effectively to scan the commutator so that the signals can be successively fed to the key punch. Several simplifications are achieved in the present invention by using an auxiliary control in the key punch itself for this scanning function. This auxiliary control is standard equipment in many key punches presently being marketed. It usually includes a rotating drum and a series of star wheels associated with the drum. A control or auxiliary program card is mounted on the drum, and this card is transported by the drum in synchronism with the movement of each information card through the key punch. The start wheels ride on the control card, and they move in and out of apertures in the card to actuate switches respectively associated with the star wheels. These switches are used in a manner to be described effectively to scan the commutator of the present invention so that signals from the commutator may be successively fed to the key punch.

In the drawings:

FIGURE 1 is a fragmentary perspective view somewhat schematically illustrating an adding machine and a key punch modified and intercoupled in accordance with the present invention;

FIGURE 1a is an enlarged perspective view illustrating a starwheel which is controlled by an auxiliary control in the key punch of FIGURE 1, and this view also shows a switching arrangement associated with and actuated by the starwheel;

FIGURE 1b is a top plan view of a key punch that may be used in the arrangement of FIGURE 1 and shows the keyboard that is normally used for actuating the key punch, and this view also shows the manner in which the information storage cards pass through the apparatus to be punched in accordance with the information that is to be recorded on them;

FIGURE 1c is a sectional view of the apparatus of FIGURE 1b substantially on the line 1c—1c and showing a plurality of punches and interposers, together with controls for these interposers so that the cards passing through the key punch apparatus may be punched at appropriate places in correspondence with the information to be recorded on the cards;

FIGURE 1d is a sectional view substantially on the line 1d—1d of FIGURE 1c and showing an individual punching mechanism in the key punch and the various controls for operating that mechanism;

FIGURE 1e is a sectional view substantially on the line 1e—1e of FIGURE 1d and showing a plurality of aligned punches and their associated control mechanisms;

FIGURE 1f is a sectional view substantially on the line 1f—1f of FIGURE 1c and showing the operating magnets or solenoids for the interposer control of the punches of the key punch apparatus;

FIGURE 2 shows a fragment of an information card as it passes through the recording machine, and FIGURE 2 also shows a fragment of an auxiliary program or control card which controls, in a manner to be described, the starwheel switching mechanism of FIGURE 1a thereby to control the signals fed to the key punch from the modified adding machine;

FIGURE 3 is a schematic diagram of an electric control system constructed in accordance with the invention for feeding signals from a commutator in the modified adding machine of FIGURE 1 to the key punch recording apparatus;

FIGURE 4 is a perspective view of a more complex type of accounting machine, such as the National Cash Register Model 31, which includes a movable carriage and on which is mounted the improved adapter and other control components of the invention and which modify the adding machine so that it may control the key punch recording apparatus in a manner to be described;

FIGURE 6 shows in some detail a commutator pivotally mounted in the adapter and the movable members of the adapter with an associated locking mechanism, and this figure shows also certain solenoid controls and electrical connections;

Figure 10:
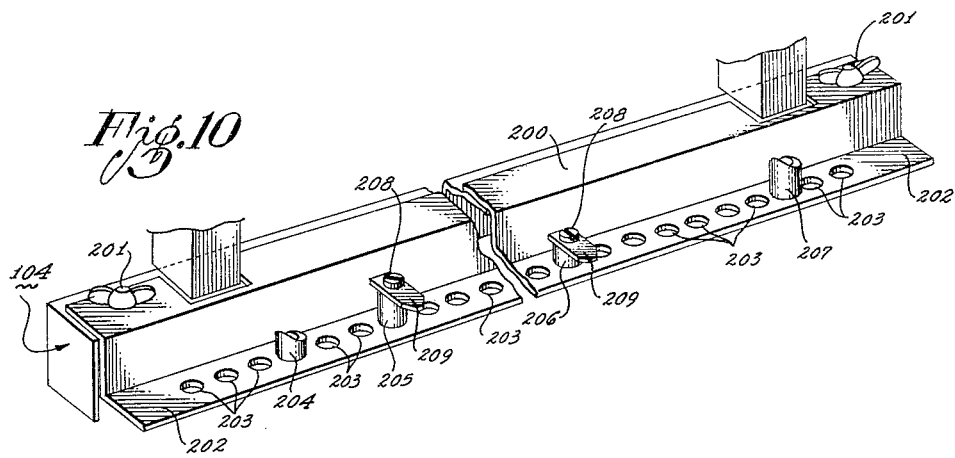
FIGURE 10 is a perspective view, on substantially the same scale as FIGURE 4, showing a switch actuator bar for use in the modified assembly of the invention and which is adapted to be mounted on the carriage of the adding machine of FIGURE 4.
Figure 11:
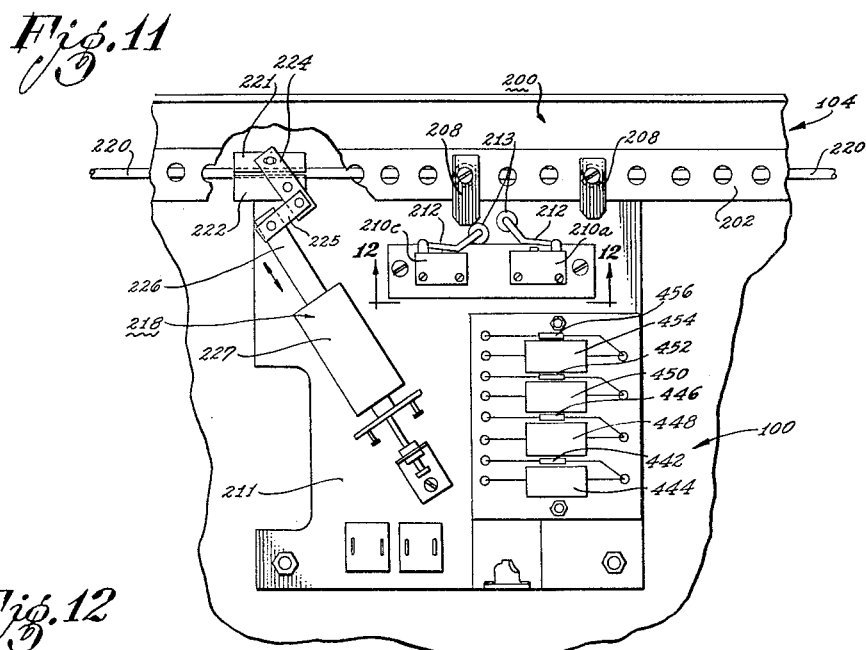
Figure 12:
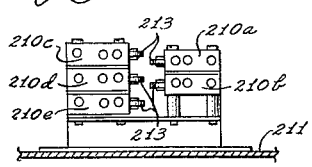

FIGURE 11 is a fragmentary top plan view of the accounting machine of FIGURE 4 showing a portion of the switch actuator bar of FIGURE 10 and a portion of a brake bar, both mounted on the movable carriage of the accounting machine, and FIGURE 11 also illustrates a control unit mounted on the machine of FIGURE 4 and supporting banks of switches for actuation by the switch actuator bar and also supporting a solenoid controlled brake for engagement with the brake bar;

FIGURE 12 is a rear view of the bank of switches mounted on the control unit of FIGURE 11, the view of FIGURE 12 being substantially on the line 12—12 of FIGURE 11; and FIGURE 13 is an electrical circuit diagram of a suitable control system for the modified accounting machine of FIGURE 4.

The particular embodiment of the invention which shall be described subsequently uses a National Cash Register electric accounting machine model 31. An accounting machine suitable for use in this invention is fully disclosed in Christian Patent 2,626,749. The accounting machine is modified in accordance with the invention, and it is adapted to be coupled to an International Business Machine Key Punch such as the type which is designated by that company as model number "024." Key punches suitable for use in this invention are fully disclosed in Lee Patent 1,976,618; Von Pein Patent 2,217,209; and Johnson Patent 2,684,719. Since the adding machine and the key punch are, in themselves, known pieces of equipment, it is believed that their construction and operation need not be described in specific detail. For that reason, only the features of these machines important to the present invention are shown in the drawings and will be described. Also, the construction and operation of these machines are known to the art and, for that reason, will be described only in a limited sense and merely to provide a background for a full description of the invention itself.

It will be appreciated as the description proceeds that the invention is not limited to any particular type of adding machine or key punch.

As shown in FIGURE 1, a modified adding machine 10, different from the more complex type of accounting machine which will be described subsequently and similar to the adding machine described in the copending application referred to above, is conveniently positioned on a supporting desk or table 12. The adding machine 10 is electrically coupled to suitable recording apparatus as, for example, a key punch 14. This coupling may be made over a pair of electric cables 16 and 18. The cables are respectively connected to the key punch 14 through appropriate plug and socket assemblies 20 and 22. The particular electric connections which are made through the cables will be described in detail subsequently.

The modified adding machine 10 may be of any suitable known construction, and it includes a usual keyboard 24. The keyboard has keys labeled "0–9," inclusive, and any desired number can be set up and stored in the memory unit of the adding machine by successively depressing the appropriate keys. This first key to be depressed represents the most significant digit of the number to be set up, and each succeeding key to be depressed represents the digits of the number in decreasing ordinal significance. The adding machine may be constructed to handle, for example, numbers having up to ten digits. Construction of the keyboard for the adding machine 10 is fully shown in FIGURES 1 and 2 of Christian Patent 2,626,749.

The keyboard 24 also includes an "add" bar 26 and a "clear" bar 28. Appropriate electric push-button switches 30 and 32 are mounted adjacent the keyboard. These latter switches are connected to the key punch 14 through connections in the cable 18. The switches are connected in parallel with corresponding push-button switches at the key punch recorder 14 and they enable certain usual key punch operations to be remotely controlled from the adding machine. For example, the switch 30 may control the release of cards by the key punch recorder, and the switch 32 may control card duplications at the key punch recorder.

The adding machine also includes a roll of paper 34 on which the numbers set up in the machine, normally to be added together, are imprinted. This paper is drawn through the machine by a well known mechanism. As is well known, the numbers to be added in the machine and the subsequent totals, are printed in columnar form on the paper.

The key punch 14 is shown as including an auxiliary control drum 36. An auxiliary drum is included in many known types of key punches and this drum is driven in synchronism with the master drum of the key punch and with the movement through the key punch of the cards on which data is to be recorded. This auxiliary drum is adapted to have an auxiliary program or control card secured to its periphery. The control card is, therefore, rotated on the drum 36 in synchronism with the movements of each information card through the key punch.

A series of aligned star wheels 38a, 38b . . . 38k, 38L are rotatably mounted in the key-punch, and these star wheels are adapted to ride adjacent one another on the surface of the auxiliary program card on the drum 36. As shown more clearly in FIGURE 1a, each of the star wheels, such as the star wheel 38a, is rotatably mounted on a movable arm such as the arm 40. The movable arm 40, in turn, is pivotally mounted at its rear extremity on a pivot pin 41. A thin resilient filament 42 is secured to a stationary bracket (not shown) at a point 43 adjacent its rear end. An upwardly extending member 37 on the movable arm 40 extends into supporting engagement with the underside of a shoe 39 at the free end of the filament 42. An electrical connection is made to the point 43, and the filament 42 constitutes the movable contact or armature of an electric switch.

A series of studs, such as the stud 44, are mounted in the key punch recorder directly under respective ones of the filaments such as the filament 42. The studs 44 are composed of electrically conductive material, and individual electrical connections are made to each of them. The arrangement is such that each of the star wheels such as the star wheel 38a rides along the surface of the auxiliary program card on the drum 36, with each star wheel engaging a different track on that surface. These tracks each have individual punchings at selected intervals which causes the associated star wheel to drop and effectively connect its filament (such as the filament 42) with its fixed contact (such as the stud 44).

This provides, therefore, a switching system in which individual ones of a bank of switches may be individually closed and opened in synchronism with the movement of each information storage card through the key punch recorder.

The control card, or auxiliary program card as it is sometimes termed, is similar in its format to the information cards. The auxiliary program card corresponds to the card P in FIGURE 41 of Johnson Patent 2,684,719. As shown in FIGURE 2, an auxiliary program card 45 is divided into a series of columns, and each column is divided to represent digits in the range, for example, of from 0 to 12 inclusive. The star wheels 38a, 38b, 38c, etc., are positioned to correspond respectively to the different digit positions in each column. Whenever a punch is made at a particular digit position in any column, the corresponding star wheel will drop when it engages that punch and close its associated switch. That is, the star wheel corresponding to the digit represented by a particular punch in a column on the control card will close when that particular column is brought into position.

The auxiliary program card is so positioned on the auxiliary drum 36 that it effectively leads the information cards, as each of the latter are processed by the key punch. This displacement corresponds to the vertical column or position on the cards. That is, when the first column of the auxiliary program or control card 45 is drawn past the star wheels, the particular information card 47 (FIGURE 2) being processed by the key punch is brought into position. Then, when the auxiliary program card is turned by the drum 36 to bring its second vertical column under the star wheels, the card 47 is moved to its first position and the first column of the card 47 is punched by the key punch recorder at the appropriate digit.

The information cards such as the card 47 are fed into the key punch from a card hopper 51 as shown in the plan view of the key punch recorder of FIGURE 1b. The showing of the key punch in FIGURE 1b of this application corresponds substantially to FIGURE 1 of Johnson Patent 2,684,719. It should be pointed out that the details of the key punch that will now be described in conjunction with FIGURES 1b–1f are those of an International Business Machine keypunch such as described in Patent 2,684,719 which issued August 19, 1950. It should again be stressed that the ensuing description of the details of the key punch are merely to describe certain features of a typical key punch relevant to the present invention and which may be appropriately controlled by the controls of the invention.

The information cards from the card hopper 51 are fed to a carriage 53 in sequence and upon the operation of the machine. The cards in the carriage 53 are carried in a direction toward the left in FIGURE 1b through the punching equipment which is indicated generally as 55. As described briefly above, the information cards are moved in a step-by-step fashion under the control of the auxiliary program card 45, so that each information card may be punched in each of its columns and at a location in each column corresponding to the digit to be recorded in that column.

After the particular information card being processed has passed through the punching equipment 55, it is moved onto a carriage 57 and is then deposited in a card stacker 59 which moves the card into a stack 61. The cards in the stack 61 have all been suitably punched in accordance with the information to be recorded. The punching of the cards is carried out by the manual manipulation of a keyboard 63 when the key punch is operated in its conventional way and is not controlled in accordance with the present invention.

The card punching equipment 55 is operated from a shaft 65 as shown in FIGURE 1c. FIGURES 1c, 1d, 1e and 1f in this application correspond substantially to FIGURES 16, 16a, 16b and 16c, respectively, of Johnson Patent 2,684,719. A pair of identical cams 67 and 67a are mounted at the opposite ends of the shaft 65 and a corresponding pair of complementary cams 69, 69a are mounted on the shaft respectively adjacent the cams 67 and 67a. A first pair of cam followers 71 and 75 (FIGURE 1d) respectively engage the cams 67 and 69 at one opposite end of the shaft 65, and a similar second pair of cam followers respectively engage the cams 67a and 69a at the opposite end of the shaft 65. The first pair of cam followers are carried on a first rocking beam 77 which is pivoted to a shaft 79 carried by the main frame of the key punch recorder. The second pair of cam followers are carried on an identical second rocking beam which is pivoted to the shaft 79 and spaced from the first rocking beam. The first of these rocking beams is pivoted at 81 to a first upwardly extending punch lever 83 (FIGURES 1c and 1d) which is reciprocally mounted in the card punch housing 85. The second beam is pivoted to a second upwardly extending punch lever 83a (FIGURE 1c). On interposer bail 87 extends between the punch levers 83, and this bail is connected to the punch levers by a pair of studs 89, 89a. The interposer bail 87 operates with a conventional punch of the type shown and described in Patent 2,524,127 granted October 3, 1950. The discussion as to the operation of the various components including the punch levers 83 and the interposer bail 87 is fully set forth in columns 21, 22 and 23 of Johnson Patent 2,684,719.

As shown more clearly in FIGURES 1d–1f, the punching equipment 55 includes twelve individual punches 89b, a corresponding die 91, and a stripper 93. The twelve punches are aligned so that they all punch within a single column of the card 47 being processed. Pivoted to each punch at 95 is an interposer 97 which is tensioned by a spring 99. The end of each of these interposers is formed to lock beneath the interposer bail 87 when its particular punch is to be operated, and to be free of this bail in the position shown in FIGURE 1d when its particular punch 89a is not to be operated. A series of latches 101 are slidably housed between a wall 103 of the punch guard and a cover plate 105 fastened to the punch frame by a pair of studs 107. A roller 101a is provided for each latch 101 to minimize friction during motion of the latches.

The latches 101 (FIGURE 1c) are actuated by individual solenoids 109 (FIGURE 1f) by means of pullwires 111 connected between the armatures 113 of respective ones of the solenoids and corresponding one of the latches 101. FIGURE 1d shows a latch 101 in position to keep its associated interposer 97 out of engagement with the interposer bail 87. In this position, the particular interposer 97 bears against the armature of an interposer switch 115 to hold the armature out of contact with the fixed contact of the switch.

When a particular punch 89b is to be operated, the solenoid 109 associated with that punch is energized. This causes the corresponding armature 113 to move, and this in turn causes the associated pullwire 111 to draw its latch 101 to the right as shown in FIGURE 1c. This frees the interposer 97 of that particular punch and allows its spring 99 to lock it beneath the interposer bail 87. On subsequent downward motion of the interposer bail, the locked interposer 97 transmits motion downwardly to its punch 89b so as to punch a hole in the particular information card 47 carried on the bed plate 117 and positioned under the punch. The operation of various components in the key punch to obtain the formation of holes is fully set forth in Lee Patent 1,976,618; Von Pein Patent 2,217,209 and Johnson Patent 2,684,719. For example, this discussion occurs in columns 21 to 24, of the Johnson patent and on pages 2 and 3 of the Lee patent.

A control system which utilizes the switching scheme of the auxiliary program card is shown schematically in FIGURE 3. This control system, for example, may be used for coupling the modified adding machine of the copending application to a key punch recorder. The modified adding machine includes a commutator 50. This commutator has a series of conductive strips 52a–52j formed on one of its surfaces. As pointed out in the copending application, the commutator may be composed of a spun-glass laminate. The conductive strips 52a–52j may be composed, for example, of platinum or other conductive substance and they are fused to the surface of the commutator by any one of the many known methods.

The conductive strips 52a–52j extend horizontally across the surface of the commutator in spaced parallel relationship, and they are insulated from one another. The conductive strips are connected through individual connectors in the cable 16 (FIGURE 1) to the interposer solenoids 109 of the key punch recorder 14.

The interposer solenoids 109 are individually actuable, and they are arranged in the described manner with respect to the information card 47 being processed to control punches 89a of increasing ordinal significance. Whenever an electric circuit is completed to a selected one of the interposer solenoids, the information card being processed is first moved into position by the key punch so that a particular column may receive a punch, and the selected interposer then causes that column to be punched at a space corresponding to a particular digit. The interposers are connected to have a common return circuit which shall be represented by the usual "ground" symbol of FIGURE 3.

In the modified adding machine, the commutator 50 is periodically brought into selective contact with a series of resilient electrically conductive brushes which are mounted on a corresponding series of movable members. These brushes are shown schematically in FIGURE 3 as 54a–54j. The movable members, as described in the copending application, are controlled by the number set up in the adding machine so as to move transversely with respect to the conductive strips 52a–52j of the commutator and assume different positions corresponding to the different digits making up the stored number. As determined by the individual positions of the movable members, the brushes contact different ones of the conductive strips on the commutator 50 when the commutator and brushes are brought into contact. Therefore, electrical connections are established by such contact with certain ones of the interposers in the key punch from the brushes 54a–54j and through the conductive strips of the commutator 50, the selection of the interposers being dictated by the relative positions of the brushes 54a–54j when the contact is made.

The brushes 54a–54j are numbered 0–9 in the illustrated circuit diagram of FIGURE 3, and they are individually connected to corresponding fixed contacts in the star wheel switching mechanism described above. These fixed contacts are designated 44a–44j in FIGURE 3.

The movable contacts of the individual star wheel switches are represented as 42a–42L in FIGURE 3. It will be understood that each of these movable contacts closes with its associated fixed contact, as its associated star wheel engages a punch in the auxiliary program card 45 of FIGURE 2.

All of the movable contacts 42a–42L are connected to a common electrical conductor 54. This common conductor is connected to the anode of a diode 55, and the cathode of this diode is connected to the contact of a normally open switch 56. This switch may be of the type presently manufactured by the Minneapolis-Honeywell Co., of Minneapolis, Minnesota, and designated by them as a "Microswitch." The switch 56 is mechanically actuated by the commutator 50, and it is closed whenever the commutator is brought into contact with the brushes 54a–54j. This action is fully described in the copending application referred to above.

The movable arm of the switch 56 is connected to the fixed contact of a normally closed relay switch 58b. The relay switch 58b is controlled by a relay winding 58, and it is opened whenever that relay winding is energized. The relay winding 58 also controls a normally open relay switch 58a whose connections will be described.

The movable arm of the switch 58b is connected to the fixed contact of a switch 60. The movable arm of the switch 60 is connected to the common ground return circuit from the interposers in the key punch. The switch 60 is operated by a relay in the key punch, and it is held open so long as that relay is energized. This relay is energized whenever a switch contact 115 (FIGURE 1d) associated with the punching equipment is closed. The main purpose of the relay is to lock the keyboard 63 (FIGURE 1b) and prevent any further operation of the keyboard while the punching operation is taking place. The relay is usually referred to as the keyboard restore relay. When the keyboard restore relay is not energized, the switch 60 is closed. A time delay is incorporated in the arrangement, and the switch 60 closes a predetermined time interval after the relay is de-energized.

The keyboard restore relay is energized whenever an interposer in the key punch is actuated, as described above and by the closure of the switch contacts 115. During the punching operation in any one field of the information card being processed, therefore, the relay controlling the switch 60 is continually being energized and de-energized. However, the intervals at which the relay is de-energized between the punching operation for any one field are not individually long enough to permit the switch 60 to close. The switch 60, therefore, is closed only between fields of the card being processed and while a new set of information is being prepared for the commutator 50 by the control of the positions of the individual movable members on which the brushes 54a–54j are mounted.

The fixed contact 44k of the star wheel switch mechanism 42k–44k is connected to the fixed contact of a switch 62. The switch 62 is also included in the key punch. The switch 62 is a timing or synchronizing switch, and it is normally used in the key punch to properly time the punching operations in order that they will occur only when a card is properly in position. The switch 62 has its movable arm connected to the common ground return circuit of the key punch interposers. This switch is controlled to close a short time after the auxiliary program card is brought into position.

Therefore, if the auxiliary program card is moved to a position such that the movable arm 42k of the star wheel switch moves down on its fixed contact 44k, no circuit is established through that arm until the switch 62 subsequently closes. Moreover, the switch 62 is opened before the auxiliary program card is moved to its next position, which movement is accompanied by the disengagement of the movable arm 42k of the star wheel switching mechanism from its fixed contact 44k. The purpose of this arrangement is to assure that the delicate star wheel switches, such as the switch 42k—44k, never make or break a circuit as this would render them susceptible to burn out from resulting arcing.

An examination of the circuit of FIGURE 3 will show that connections can be completed to the common ground return circuit of the key punch interposers either through the switch 42, 44k and the switch 62; or through the diode 55 and the switches 56, 58b and 60. In either event, the switches 60 and 62 are controlled to open and close the circuits before the opening or closing of any of the switch contacts 42a–42L and 44a–44L to assure that these latter delicate contacts will never actually make or break the circuit.

The relay winding 58 is connected to the positive terminal of a source of direct voltage 64. The negative terminal of this source is connected to the common return circuit or ground. The relay winding 58 is shunted by a diode 66 for well known damping purposes and to prevent arcing of its contacts from the reverse voltage surges as the contacts are broken.

The other terminal of the relay winding 58 is connected to the anode of a diode 68. The cathode of this diode is connected to the fixed contact of the normally open relay switch 58a. It should be remembered that this normally open switch is controlled by the relay winding 58, and that it is closed when the winding is energized. The movable arm of the switch 58a is shown as being connected to the stationary contact of the switch 62.

A solenoid winding 70 has one terminal connected to the positive terminal of the source 64. The other terminal of this winding is connected to the fixed contact of the relay switch 58a. The solenoid winding 70 is shunted by a damping diode 72. This solenoid is coupled to the control mechanism for the commutator 50, as is fully described in the copending application referred to previously. When the solenoid winding is energized, it causes the commutator to break its contact with the brushes 54a–54j and it permits the interrupted cycle of the modified adding machine to be continued to completion.

The fixed contact 44L of the star wheel switch mechanism 42L—44L is connected to the cathode of a diode 74, and the anode of this diode is connected to the anode of the diode 68.

In the manner described in detail in the copending application referred to previously, a number to be recorded is set up in the memory unit of the modified adding machine 10 of FIGURE 1 by the manual manipulation of its keyboard 24. This number is then fed to a series of movable members or racks in the adding machine, and these movable members assume different individual positions corresponding to the digits of that particular number. The operational cycle of the machine is interrupted at this point, and the commutator 50 is brought into contact with the brushes 54a–54j by an appropriate mechanical linkage, or by any other suitable means. These brushes contact respective ones of the segments 52a–52j of the commutator, the selection of these segments being determined by the relative positions of the various movable members on which they are mounted.

As the commutator is brought down into contact with the brushes 54a–54j, the switch 56 is closed. Also, and due to the fact that the keyboard restore relay in the key punch now has had time to release its contacts, the switch 60 is closed.

The auxiliary program card was previously moved by the drum 36 of FIGURE 1 to its first position and, assuming that the first number has four digits and so requires a four column field (as illustrated in FIGURE 2), the auxiliary program card contains a punch at the No. 4 row in its first column. This causes the contact 42e of the star wheel switch mechanism 42e—44e to close with its contact 44e for the first position of the auxiliary program card. Because, and as pointed out previously, the auxiliary program card 45 leads the card 47 by one position, the contact 42e is already closed on its contact 44e, when the commutator 50 is brought into contact with the brushes 54a–54j to close the switch 56.

A circuit is completed by the closure of the switch 56 through the diode 55 and through the switches 56, 58b and 60 to the common return circuit of the interposers. Also, the star wheel switch 42e—44e completes the circuit to the brush 54e, and through the commutator segment engaged by that brush, to the key punch interposer solenoid connected to that segment. Assuming that the brush 54e is contacting the "zero" segment on the commutator, the "zero" interposer solenoid will be actuated to move the information card 47 into position and to punch zero in the first column of that card, as is shown in FIGURE 2.

This movement of the information card 47 to its first position by the "zero" interposer solenoid causes the auxiliary program card 45 to be moved by the drum 36 to its second position. It will be seen that the auxiliary program card has a punch in the No. 3 row of its second column which corresponds to the second position of the card. This second column also has a punch in its No. 12 row. Therefore, both the 42k—44k and the 42d—44d star wheel switches close. However, the keyboard restore relay is now energized so that the switch 60 is opened, and the path through this switch to the common return circuit of the interposer is broken. However, and because the number 42k—44k star wheel switch is closed, contact to the common return circuit is established when the switch 62 closes. When this occurs, the brush 54d is activated and the circuit is completed through whichever commutator segment that brush is positioned to contact. In the illustrated example of FIGURE 2, the brush 54d is assumed to be positioned by its associated rack so that it contacts the commutator segment 52g and the No. 3 interposer solenoid in the key punch recorder is activated. Therefore, the information card is moved to its second position and its second column then is punched at a position corresponding to the No. 3 digit as is shown on the card 47 of FIGURE 2. Apparatus for sequentially stepping the auxiliary program card 45 and the information card 47 on a synchronous basis to each column after the recording of information in the previous column of the information card is fully set forth in lines 1 to 36, inclusive, of Johnson Patent 2,684,719.

The movement of the information card to its second position causes the auxiliary program card to be moved to its third position. In like manner, contact is now established through the brush 54c and through the commutator 50 to, for example, the No. 2 interposer. Also in like manner and, in the next cycle of operations, contact may be established through the brush 54b and through the commutator 50 to, for example, the No. 4 interposer.

Because the first field of the information card 47 was set up to be a four digit field, the fourth column of the auxiliary program card 45 is additionally punched at the No. 11 row. This causes the No. 11 star wheel switch 42L—44L to close, together with the star wheel switch 42k—44k. Therefore, when the timing switch 62 in the key punch subsequently closes, it also completes a circuit to the relay winding 58 to energize that winding. This causes the relay switch 58a to close and the relay switch 58b to open. The closure of the switch 58a completes a circuit to the solenoid winding 70, so that the solenoid winding 70 is energized to enable the solenoid to perform its above mentioned function and release the commutator 50 and permit the modified adding machine 10 to complete its operational cycle.

The subsequent opening of the timing switch 62 deenergizes the relay winding 58. This causes the switch 58a to open and the solenoid winding 70 again to be deenergized. It should be noted that the keyboard restore switch 60 in the key punch is now closed and ready to initiate the operations for the next field. Any premature closure of the switch 60 has no adverse affect on the system because the switch 58b immediately opens when the relay winding 58 is energized. Furthermore, the switch 58b remains open until the solenoid 70 causes the commutator to be retracted and the switch 56a thereby to be opened. Therefore, during this interval, either the switch 58b or the switch 56a is open so that the closure of the switch 60 is ineffective.

For the next field, therefore, the system remains inactive until the movable racks and brushes of the modified adding machine 10 are again established at selected individual positions, and until the commutator 50 is again brought into contact with the brushes. The moment this occurs, the switch 56 closes to complete a circuit through the particular star wheel switch which is allowed to close by the auxiliary program card 45, which card is already in its first position for the second field.

Assuming that the second field is to be a ten digit field, the first punch on the auxiliary program card 45 in the second field is at the No. 0 row as shown in FIGURE 2. The sequences of operation for the second field are similar to those described in conjunction with the first field. The auxiliary program card 45 causes the brushes 54a–54j to be successively connected in the proper order to the common return circuit of the interposers, and in each instance the selected interposer is determined by the relative position between the brushes and the segments 52a–52j of the commutator 50.

It will also be noted that the initial operation in each field is controlled by the closure of the switch 56 which occurs when the commutator 50 is brought down into contact with the brushes 54a–54j. However, the subsequent operations in each field are controlled by the switch 62 and through the star wheel switch 42k—44k, this latter switch being closed for each subsequent position of the auxiliary program card 45 by virtue of the punch at the No. 12 row in each column in the second field of the auxiliary program card 45 after the first column in that field.

At the end of each field, the auxiliary program card 45 has a punch at the No. 11 row, so that the star wheel switch 42L—44L closes at the end of the second field to actuate the control system of the relay 58 in the described manner.

Similar control punchings may be provided on the auxiliary program card 45 for subsequent fields on the card 47. This convenient and simple system enables control signals from the commutator 50 to be fed in succession to the key punch for successive operations of the key punch interposers. Each field on the processed information cards is initiated from the modified adding machine by the contact of the commutator 50 with the preset brushes 54a–54j, which closes the switch 56, and each field is terminated by the auxiliary program card control in the key punch which causes the star wheel switch 42L—44L to energize the solenoid winding 70.

The basic type of control system of FIGURE 3 may be utilized in conjunction with a more complex type of adding machine such as the National Cash Register Model #31 to enable such a machine conveniently to control a key punch recorder. Such a machine may be used when it is modified in accordance with an embodiment of the invention. This particular model is illustrated at 100 in the perspective view of FIGURE 4, and an adapter unit 102 constructed in accordance with the present invention is mounted on the rear of the adding machine 100. This adapter unit, in a manner to be described, permits the adding machine to control a key punch recorder with a minimum of additional components and with no appreciable disturbance of the operating components of the adding machine itself.

The accounting machine 100 of FIGURE 4 includes a movable carriage 104 which is adapted to shift as the various digits of each number are set up in the machine. No attempt will be made to describe the normal operation of the accounting machine 100 as such is well known to the art. This machine, in common with all accounting machines, is capable of printing columns of numbers on a recording paper, and of totalizing these numbers. These numbers are established by a somewhat complex keyboard 106, and various operating controls well known to the accounting machine art are mounted adjacent the keyboard. One of these controls, for example, includes a usual "add" bar 108 similar to that discussed previously. As previously described, the keyboard 106 is shown in FIGURES 1 and 2 of Christian Patent 2,626,-749. The add bar 108 in this application corresponds to the "main" key shown in FIGURES 1 and 2 of the Christian patent. The keyboard is also discussed in column 94 of the Christian patent.

The carriage 104 includes a series of stops 110 which are manually adjustable to different positions and which permit different fields of data to be added or otherwise dealt with by the machine. The stops 110 are fully shown in FIGURES 4 and 95 of Christian Patent 2,626,-749 and are disclosed in cloumn 62 of that patent. This data is printed by the machine on a strip of paper such as the paper 112 which is reeled through the machine in known manner, and also on additional paper such as the sheet 113.

The machine 100, in common with other accounting machines, includes a mechanical memory unit in which the digits of each number are stored as the numbers are being set up by the manual control of the keyboard 106. Each number as it is completed is then transferred to a series of movable means, such as the racks 114, by pressing the add bar 108. The racks 114 correspond to the racks 617 in FIGURE 3A of Christian Patent 2,626,749, the operation of the racks 617 being set forth in columns 25 and 26 of the Christian patent. These racks in the illustrated embodiment are horizontal, and they are moved to and assume different horizontal positions corresponding to the various digits making up the particular number set up at any particular time in the machine. This action, to a large extent, is similar to that described in the copending application. However, in the machine 100, the carriage 104 moves to the right in FIGURE 4 as each group of digits is established by pressing a "motor bar" key of the keyboard. This motion of the carriage is used to control the key punch, in a manner to be described, so that as the carriage moves, the key punch is controlled to record successive fields of data on the particular card being processed. At the end of such processing the carriage is returned to the left in FIGURE 4 and is ready for the next card.

Figures 5, 8, 9:
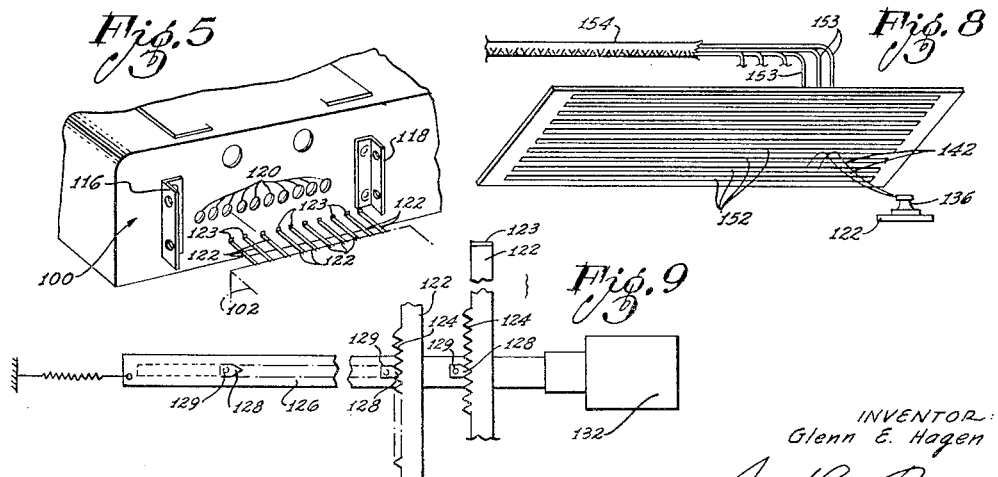
FIGURE 5 is a fragmentary rear view of the accounting machine of FIGURE 4 taken substantially on the line 5—5 of FIGURE 4, with the adapter unit of the invention removed and showing mounting brackets for the adapter and holes through which various movable operating racks or members of the adapter extend.
FIGURE 8 is a perspective view of the underside of the commutator of FIGURE 6 showing how the resilient brushes of each of the movable members may make electrical contact with individual conductive strips on the insulating supporting face of the commutator.
FIGURE 9 is a top plan view of the locking mechanism of the adapter of FIGURE 6, which mechanism is shown as including a resiliently biased cross bar and a releasing solenoid coupled to the cross bar.

As shown more clearly in FIGURE 5, the adaptor unit 102 of the present invention is supported by a pair of brackets 116 and 118 on the rear wall of the adding machine 100. The brackets are mounted on the adding machine by suitable set screws, and appropriate set screws mount the adaptor in the brackets. A series of holes 120 are formed in the rear wall of the adding machine in respective axial alignment with the racks 114 of the machine.

A series of horizontal movable elongated control members 122 are slidably mounted in the adaptor unit 104. These movable members are in respective axial alignment with the racks 114 of the adding machine when the adaptor 102 is mounted in place on the brackets 116 and 118, and the members 122 extend into the adding machine through corresponding ones of the holes 120. Each of the members 122 has a bentover end portion 123 which engages the end of a corresponding rack 114. Then, as a particular rack 114 is moved to the rear of the adding machine 100 a distance corresponding to the value of the particular digit represented by it, it pushes the corresponding movable member 120 of the adaptor unit 102 back into the adaptor a predetermined distance.

Figure 6:
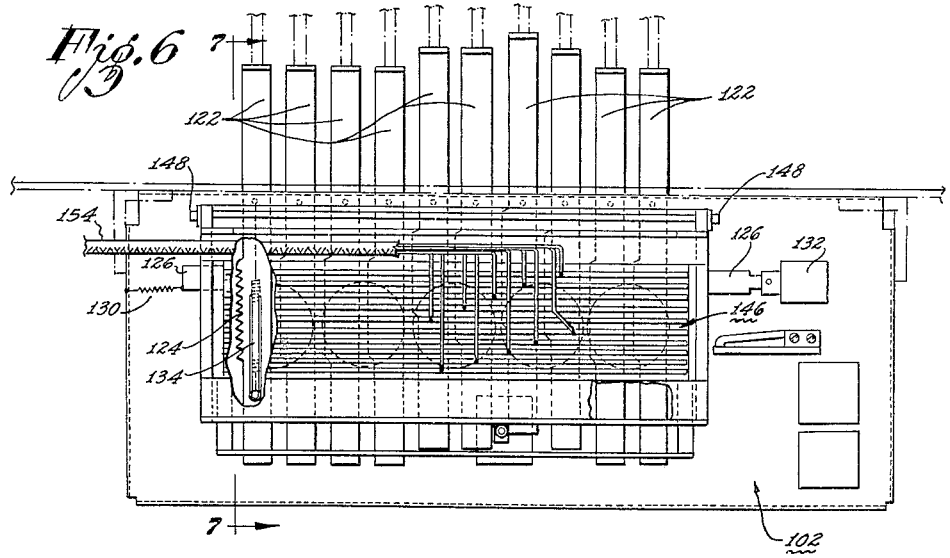
FIGURE 6 is a top plan view of the adapter unit of the present invention on a somewhat enlarged scale with respect to FIGURES 4 and 5.

Each of the movable members 122 is notched at one side, as more clearly shown in FIGURE 9, the notches being represented at 124. As previously noted, the members 122 are all slidably mounted within the adaptor 102 on suitable brackets (not shown). A cross-bar 126 is also slidably mounted on appropriate brackets in the adaptor 102. This cross-bar extends under and across the members 122, and it has a series of dogs 128 mounted on its upper surface as by screws 129 (FIGURE 9). These dogs correspond in number to the number of movable members 122 and they engage the notches 124 on respective ones of the members 122. The cross-bar 126 is spring biased to the left in FIGURES 6 and 9 by a suitable spring 130 (FIGURE 9). The spring 130 is fastened at one end to the cross-bar 126 and at the other end to an appropriate stationary bracket (not shown) in the adaptor 102.

The other end of the cross-bar 126 is secured to the armature of a solenoid 132. When the solenoid 132 is energized, the cross-bar 126 is moved to the right in FIGURE 9 against the bias of the spring 130 so that the dogs 128 engage the notches 124 of the respective movable members 122. Therefore, after the movable members 122 have been individually moved into the adaptor 102 by respective ones of the rack 114, the solenoid 132 may be energized to move the cross-bar 126 and cause the dogs 128 to energize the notches 124 in respective ones of the members 122. These dogs serve to hold the members 122 at their established positions after the corresponding racks 114 have been retracted. The cross-bar 126 and the associated dogs 129, therefore, hold the various elongated members 122 in individual positions corresponding to those occupied by the racks 114 in representing the digits of a particular number, and after the racks have been returned to their zero position by the accounting machine 100.

The members 122, therefore, effectively represent the various digits of the particular number being processed by the accounting machine 100 at that particular moment. When the solenoid 132 is deenergized, the spring 130 moves the cross-bar 126 to the left in FIGURES 6 and 9. This causes all of the dogs 128 to move out of the notches 124 and to release the elongated movable members 122.

Figure 7:
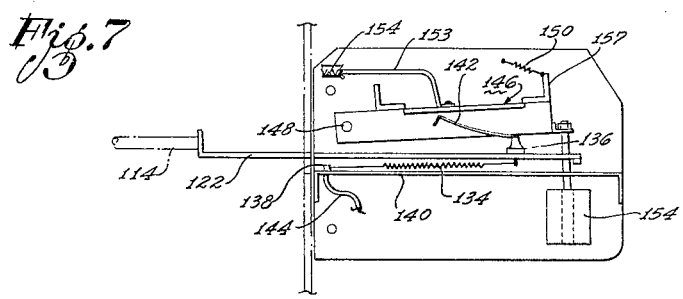
FIGURE 7 is a sectional view substantially on the line 7—7 of FIGURE 6 showing the pivotally mounted commutator and its solenoid control, and also showing one of the elongated movable members of the adapter unit and a resilient brush mounted on that member.

As shown in FIGURE 7, for example, each of the movable members 122 is biased by a spring such as the spring 134 towards the face of the adaptor 102 that is mounted on the wall of the accounting machine 100. These springs are secured to electrical terminals such as the terminal 136. These terminals extend through the corresponding ones of the movable members 122. The other ends of the springs are respectively secured to individual terminals such as the terminal 138, which are insulated from one another and which extend through an insulated supporting panel 140. The supporting panel is secured to the walls of the adaptor 102 by any suitable fastening means. The springs such as the spring 134 serve, therefore, to bias their corresponding movable members 122 to the left in FIGURE 7 and forwardly corresponding ones of the holes 120 in the rear wall of the accounting machine 100.

Therefore, when the racks 114 of the accounting machine 100 are actuated to individual positions representing the digits of the number being processed, they push the members 122 back into corresponding individual positions. The members 122 are held in these individual positions by the cross-bar 126 after the racks 112 have been retracted by the adding machine, and the members 122 continue to be held in these positions until the solenoid 132 is energized to move the cross-bar and release them. The springs 134 then become effective in moving the members 122 back to their initial positions. The members 122 can be considered as positioning means since the racks 114 become positioned in accordance with information from the accounting machine and are in turn used to control the positioning of the members 122, which in turn control the information recorded by the key punch.

Each of the movable members 122 has a pair of resilient electrically conductive brushes 142 secured to its terminal 136, as shown, for example, in FIGURES 7 and 8. An individual electrical connection is made to the brushes 142 on each of the movable members 122 through its associated spring 134, through its terminals 136 and 138, and then through its individual connecting lead 144. The brushes 142 in FIGURE 13 correspond to the brushes 54a to 54j, inclusive in FIGURE 3.

A commutator member 146 is pivotally mounted in the adaptor 102 so that it extends over and across the movable members 122. The commutator is mounted on a shaft 148, and it is biased in a counter-clockwise direction as viewed in FIGURE 7 by a suitable resilient biasing means such as a spring schematically shown at 150. This spring (or other similar biasing means) extends between a bracket 151 on the edge of the commutator remote from the pivot shaft 148 to a suitable stationary bracket (not shown) in the adaptor 102.

The commutator 146, like the commutator described in the description of FIGURE 3 and in the copending application referred to above, may be composed of an appropriate insulating material such as spun glass. A series of spaced parallel electrically conductive strips 152 (FIGURE 8) are formed on the lower face of the commutator and these strips are in spaced insulating relationship. The strips 152, as previously noted, may be formed of any suitable electrical conductor and may be fused to the surface of the commutator by any known technique.

The individual conductive strips 152 traverse the paths of the movable members 122, and they are adapted to be individually contacted by the pairs of brushes 142 mounted on respective ones of these members. The particular strip 152 on the commutator 146 contacted by the brushes 142 on a particular movable member 122 at any one time is dependent upon the position of that movable member 122 at that time.

The commutator 146 is normally biased by the spring 150 out of engagement with the various pairs of brushes 142 on the respective movable members 122. The commutator is held in this disengaged position until all the movable members 122 have been set to their individual positions by the racks 114 of the accounting machine, and locked in those positions by the cross-bar 126. Then, a solenoid 154 is energized, and the armature of this solenoid (which is coupled to the edge of the commutator 146 remote from the shaft 148) draws the commutator down against the bias of the spring 150 until electrical contact is established between the conductive strips 152 and respective ones of the brushes 142. This presetting of the brushes 142 before the conductive strips 146 are drawn into contact with them assures that there will be no sliding motion of the brushes 142 across the commutator. Such sliding motion would tend to damage the delicate brushes. Individual leads 153 are connected to corresponding ones of the individual conductive strips 152 on the commutator, and these leads are formed into a cable 154.

Further in accordance with the invention, a switch actuator bar 200 (FIGURE 10) is mounted on the carriage 104 of the accounting machine 100 as shown in FIGURE 4. This switch actuator member extends behind and along the length of the carriage, and it is mounted on brackets formed at each end of the carriage. The switch actuator bar is held in place by screws 201 extending through these brackets and associated wing nuts. The switch actuator bar shown in FIGURE 10 corresponds to members shown in FIGURES 4, 70 and 95 in Christian Patent 2,626,749 and described in columns 62 and 63 of that patent.

The switch actuator bar 200 has a rear horizontal flange 202 extending along the length of the bar. This flange has a series of equally spaced holes 203 extending along its length. The holes 203 permit bushings, such as the bushings 204, 205, 206 and 207 to be mounted at selected and adjustable intervals along the flange 202. These bushings have different lengths, and they are mounted on the flange 202 as by screws 208. Horizontal stops such as the stops 209 are supported on the various bushings by the screws 208. These stops protrude beyond the margin of the flange 202 and at different levels as determined by the bushings.

Banks of switches 210 are mounted on a control panel 211 which in turn is mounted on the accounting machine 100 to the rear of the carriage 104, as shown in FIGURE 4. Each of the switches is equipped with an actuating arm 212 which is normally biased away from the switch by the spring biased actuating button of the switch. A roller 213 is mounted at the end of each actuating arm 212, and these rollers are engaged by respective ones of the stops 208 as the carriage 104 and the switch actuator bar 200 move from position to position. Sensing fingers corresponding to the arms 212 in FIGURE 11 of this application are shown in FIGURES 99 to 103, inclusive of the Christian Patent 2,626,749 and are disclosed in columns 86 to 90 of the patent. These sensing fingers may correspond to the sensing members 1890, 1891, 1892 and 1893 of the Christian patent.

The switches may be mounted on the control panel 211 in banks, as shown by the switches 210a–210e in FIGURE 12. Different ones of the switches, therefore, may be actuated by different ones of the stops 208 as determined by the level at which any particular stop is mounted on its supporting bushing.

The stops 208 may be arranged to correspond to different fields of data that are to be recorded on the information cards in the key punch recorder. The actuation of the switches 212a, 212b, etc., by the stops provide certain control effects which will be described.

A solenoid actuated brake mechanism 218 is also mounted on the control panel 211. A brake bar 220 is mounted on the carriage 104 under the rear flange 202 of the switch actuator bar 200, and this bar extends the length of the carriage. The brake bar is securely mounted on the carriage by suitable fasteners (not shown).

A pair of brake shoes 221 and 222 are supported by a linkage 224 under the flange 202 and in embracing relation with the brake bar 220. The linkage 224 is coupled to a further link 225 which, in turn, is coupled to the armature 226 of a solenoid 227 in the brake mechanism. As long as the solenoid 227 is not energized, the brake bar 220 is free to slide between the shoes 221 and 222. However, when the solenoid 227 is energized, its armature 226 is moved in a manner to cause the linkage 224 to close the brake shoes 221 and 222 toward one another against the brake bar 220. This action effectively causes the carriage 104 to come to an immediate stop. The solenoid 227 is controlled in a manner to be described to stop the carriage whenever a stop 208 engages a particular one of the switches 212a–212e.

A suitable control system is shown in FIGURE 13 for coupling the equipment shown in FIGURES 4 to 12, inclusive, to a key punch recorder of the type described in conjunction with FIGURE 1.

As in the control system of FIGURE 3, the commutator segments 152 of the control system of FIGURE 13 are connected to individual leads in the cable 16 and through the cable to the individual interposers of the key punch. The fixed contacts 44a–44j of the star wheel switches are respectively connected to the brushes 142, as in the previous control system. Also, the movable arms 42a—42L of the star wheel switches are connected to a common lead 54, and the key punch timing switch 62 connects the fixed contact 44k of the star wheel switch 42k—44k to the grounded common return circuit of the interposers.

In the illustrated embodiment of the invention, the commutator 50 is brought into position against the brushes 142 in the described manner and under the control of the solenoid 154. This solenoid includes an energizing winding 400 which has one terminal connected to the positive terminal of the source of direct voltage 64. The solenoid winding 400 is shunted by a usual damping diode 402. The other terminal of the solenoid winding 400 is connected to the movable arm of a normally open switch 400a which is controlled by the solenoid and which is closed when the winding 400 is energized.

The fixed contact of the switch 400a is connected to the fixed contact of a normally closed relay switch 404b. The relay switch 404b is controlled by a relay winding 404 and is opened when the relay winding is energized. The relay winding 404 is shunted by a series-connected capacitor 406 and resistor 408. The capacitor and resistor 406 and 408 help to prevent arcing of the relay contacts, and they also delay the actual opening of certain ones of the relay switches and the closing of other ones of the relay switches after the winding 404 is de-energized.

One terminal of the relay winding 404 is connected to the fixed contact of a normally open relay switch 404a. This switch is controlled by the winding 404, and it is closed when the winding is energized. The movable arms of the switches 404a and 404b are connected together and to the left fixed contact of a single-pole double-throw reset push button switch 410. The movable arm of the push button switch is connected to grounded common return circuit from the interposers of the key punch, and this arm is normally spring biased against its left fixed contact by a usual spring 411.

The solenoid winding 400 also controls a normally open switch 400aa, and this switch is closed when the solenoid winding is energized. The fixed contact of the switch 400aa is connected to the movable arms of the switches 404a and 404b. The movable arm of the switch 400aa is connected to one terminal of a solenoid winding 412. This solenoid winding controls the solenoid 132 which serves to lock the movable members 122 in the adapter unit 102 in their individual preset positions and in the manner described previously. The solenoid winding 412 is shunted by a damping diode 414. The other terminal of the solenoid winding 412 is connected to the positive terminal of the source of direct voltage 64.

The solenoid winding 412 controls a normally open relay switch 412a, and closes this switch when the winding is energized. The movable arm of the switch 412a is connected to the positive terminal of the source of direct voltage 64. The fixed contact of the switch 412a is connected to the other terminal of the relay winding 404, and this fixed contact is also connected to one terminal of a solenoid winding 416. This latter solenoid winding controls the solenoid 227, which, in the previously described manner, actuates the brake mechanism 218 which holds the carriage 104 of the accounting machine 100 in a fixed position until the recording operation of a set of data by the key punch is complete.

The solenoid winding 416 is shunted by a usual damping diode 418. The other terminal of the winding 416 is connected to the anode of a diode 420. The cathode of the diode 420 is connected to the right-hand contact of each of the series of switches 210b, 210c, 210d, 210e (FIGURE 12), these switches being of the single-pole, double-throw type. The cathode of the diode 420 is also connected to the movable arm of the switch 210a which is a single-pole single-throw type.

The fixed contact of the switch 210a is connected to the fixed contact of a starting switch 423, and the movable arm of the starting switch is connected to the lower terminal of the solenoid winding 400. The starting switch 423 is controlled by the accounting machine 100, and this switch is closed each time a complete set of digits is set up in the racks of the adding machine for any one field.

The fixed contact of the switch 210a is also connected to the movable arm of a credit balance switch 425. During normal operation of the adding machine, the switch 425 is open. The fixed contact of the switch 425 is connected to the cathode of a diode 424. The anode of the diode is connected to one terminal of a relay winding 426 which constitutes the credit balance control of the adding machine 100. The winding 426 is shunted by a usual damping diode 428, and the other terminal of this winding is connected to the positive terminal of the source of direct voltage 64.

The credit balance relay winding 426 controls a normally open relay switch 426a, and this switch is closed when the relay winding is energized. The movable arm of the switch 426a is connected to the fixed contacts of the switches 400a and 404b, and the fixed contact of the switch 426a is connected to the lower terminal of the credit balance relay winding 426. The accounting machine includes a reverse key 427 which permits a subtraction to be made. This key is in the form of a switch, and it is connected in shunt with the credit balance switch 425.

The fixed contact 44L of the star wheel switch 42L—44L is connected to the cathode of a diode 430 and to the cathode of a diode 432. The anode of the diode 430 is connected to the lower terminal of the relay winding 404. The anode of the diode 432 is connected to the fixed contacts of the relay switches 400a and 404b.

The credit balance relay winding 426 also controls a switch 426aa and closes that switch whenever the relay winding is energized. The switch 426aa connects the cathode of the diode 55 to a separate interposer in the key punch.

This latter interposer punches, for example, a No. 11 position on the information card, whenever a succeeding field is to be a subtraction or a credit balance. The switch 426aa completes a circuit for this interposer down through a switch 412aa and through the switch 60 to the common return circuit for the interposer solenoids. The switch 412aa is controlled by the rack lock solenoid winding 412, and this switch is closed when that solenoid winding is energized.

The cathode of the diode 420 is also connected to one terminal of a resistor 440. The other terminal of this resistor is connected to the positive terminal of the source 64. One fixed contact of a carriage reverse switch 429 of the accounting machine 100 is connected to one terminal of the resistor 440, and the movable arm of this switch is connected to the other terminal of the resistor. The switch 429 is a usual component in carriage type adding machines of the type illustrated in FIGURE 4. The switch is a single-pole double-throw type, and its movable arm engages the left fixed contact mentioned above when the carriage is undergoing a reverse movement. When the carriage, on the other hand, is moving in its forward direction, the movable arm of the switch 429 engages its right fixed contact which is connected to the fixed contacts of the switches 400a and 404b. The mechanical coupling of the switch 429 to the carriage 104 of the accounting machine to cause the switch to function in the above manner is known. This coupling, therefore, need not be described in detail.

A series-connected capacitor 442 and a resistor 44 connect the movable arm of the switch 210e to ground. A capacitor 446 and a series-connected resistor 448 connect the movable arm of the switch 210d to ground. A capacitor 450 and a series-connected resistor 452 connect the movable arm of the switch 210c to ground; whereas, a capacitor 454 and a series resistor 456 connect the movable arm of the switch 210b to ground.

The movable arms of the switches 210b–210e are spring biased so that they noramlly engage their respective left-hand fixed contacts. The left-hand contact of the switch 210b is connected to the cathode of a diode 460 and to the cathode of a diode 462. A resistor 464 connects the anode of the diode 460 to a terminal "N" of the key punch. The terminal "N" is disclosed in Johnson Patent 2,684,719, as evidenced by the inclusion of an automatic "space" command in the program card P of FIGURES 41 and 41A in the Johnson patent. When an electric circuit is completed through this terminal, and in known manner, the key punch is controlled to provide a "space" on the information card being processed. The anode of the diode 462 is connected to a terminal "P" on the key punch. The terminal "P" may be obtained from one of the switches associated with the relay R30 in Johnson Patent 2,684,719. For example, the terminal "P" may be obtained from one of the contacts in the switch R30f which is shown in FIGURE 44e of the Johnson patent and which is disclosed in columns 38 and 39 of the Johnson patent. When an electric circuit is completed through this latter terminal, the key punch is caused to skip a predetermined number of columns on the information card being processed.

The left-hand fixed contact of the switch 210c is connected to the cathode of a diode 466. The anode of the diode 466 is connected to a terminal "R" of the key punch. When an electric circuit is completed through this terminal "R," information from the precedingly processed information card is automatically duplicated in known manner on the information card being processed. The terminal "R" may be obtained from one of the contacts 91 which are shown in FIGURE 9 and described in column 8 of Von Pein Patent 2,217,209.

The left-hand terminal of the switch 210d is connected to the cathode of a diode 468. The anode of this diode 468 is connected to a terminal "S" on the key punch. When an electric circuit is completed through this latter terminal, the programing of the key punch is automatically switched to an alternate program in known manner. That is, the key punch is now caused to obey the information recorded on the lower section of the master card included in the key punch, instead of the upper section. The use of a master card in a key punch to program the key punch is well known to the art.

The left-hand terminal of the switch 210e is connected to the cathode of a diode 470 and to the normally open contact of the reset button switch 410. The anode of the diode 470 is connected to a terminal "T" on the key punch. Whenever an electric circuit is completed through this latter terminal, the card being processed by the key punch is released. The terminal "T" may correspond to a contact in one of the switches associated with the relay 44 in Johnson Patent 2,684,719. For example, the terminal may correspond to one of the contacts in the switch 44a which is shown in FIGURE 44a of the Johnson patent and which is disclosed in columns 43 and 44 of the Johnson patent. The terminal "T" can also correspond to one of the switches associated with the relay 32, which is disclosed in column 43 of the Johnson patent.

The connections described above to the terminals "N," "P," "R," "S" and "T" are made through individual leads in a coupling cable, like the cable 18 of FIGURE 1. These terminals are electrically connected to depressible keys on the control panel of the key punch such as the key punch designated as Type "024" by International Business Machines. A full electrical schematic of the Type "024" key punch is presented on drawing "22801P," a copy of which is shipped by IBM to each purchaser of the key punch.

When a set of digits corresponding to a particular number is being set up in the adding machine 100, and assuming that the credit balance control of the adding machine is not in use, the relay and other switches assume their positions illustrated in FIGURE 13. At the beginning of any particular field one of the stops 209 on the switch actuator bar 200 mounted on the carriage 104 engages the switch 210a to close that switch. Then the switch 423 is closed to indicate that the data for that field has been set up and rack members of the accounting machine have assumed their desired positions. A circuit is now completed from the positive terminal of the source 64 through the commutator solenoid winding 400, through the closed switch 210a, through the movable arm and the right-hand fixed contact of the switch 429, through the switch 404b, and through the left-hand fixed contact and movable arm of the reset push button switch 410 to ground. The solenoid winding 400, therefore, is energized and the solenoid 154 is actuated to bring the commutator 146 into contact with the brushes 142. When the winding 400 is energized, it additionally causes the switch 400a to be closed which completes a holding circuit for the winding, and it also closes the switch 400aa so as to obtain an energizing of the solenoid winding 412. When the solenoid winding 412 is energized, the solenoid 132 is actuated to lock the movable members 122 in the adapter unit 104 in their established positions.

When the solenoid winding 412 is energized, it additionally causes the switches 412a and 412aa to be closed. The closure of switch 412a causes the solenoid winding 416 to be energized, and this actuates the brake solenoid 227 to hold the adding machine carriage 104 fixed until the data has been transferred to the key punch.

The closure of the switch 412aa causes the first column of the first field of the information card to be punched in a manner similar to that described in conjunction with the control system of FIGURE 3. Subsequent columns in the field are then punched by the successive closures of the timing switch 62 in the key punch, and in the previously described manner.

As before, and when the last column of a field on the information card being processed is next to be punched, the star wheel switch 42L—44L closes, causing the relay winding 404 to be energized. When the relay 404 is energized, it causes the relay switch 404b to open and the relay switch 404a to close. The closure of the relay switch 404a forms a holding circuit for the relay winding 404. The opening of the relay switch 404b conditions the solenoid winding 400 to be de-energized. However, by virtue of the connection through the diode 432, this solenoid winding remains energized until the star wheel switch 42L—44L opens. This permits the last column of each field of the information card being processed to be punched, and this assures that the commutator 146 will not be released until the auxiliary program card is moved to the next field. Then, the solenoid winding 400 is de-energized and the switches 400a and 400aa open. The opening of the switch 400aa causes the rack lock solenoid winding 412 to be de-energized, and this causes the movable members 122 to be released. The opening of the switch 400a removes the holding circuit connection from the commutator solenoid winding 400, and this allows the commutator to return to its out-of-contact position. When the winding 412 is de-energized, the switch 412a opens to de-energize the relay winding 404 and the carriage brake solenoid winding 416. The carriage, therefore, is now free to move into the next field so that the next set of data may be transferred to the key punch recorder.

It is apparent that when necessary, a card may be manually released at any time before it would normally be automatically released. This is achieved merely by actuating the reset push button switch 410 to move its arm from its left fixed contact to its right fixed contact. Such actuation of the reset push-button opens the circuit to the solenoid winding 400 to release the commutator to its inoperative position. This actuation also opens the circuits to the solenoid windings 412 and 416 to release the movable members 122 and the carriage 104. Such actuation of the switch 410 also places a ground on the lead to the terminal "T" of the key punch to complete the circuit and release the information card being processed.

When the system is first placed in operation, the capacitors 442, 446, 450 and 454 will receive a charge from the key punch recorder. This charge is received from the corresponding key punch terminals "N," "P," "R," "S," and "T" and through the respective switches 210b, 210c, 210d, 210e. Should a stop 208 on the switch actuator bar 200 attached to the accounting machine carriage 104 engage the switch 210b, the switch is set in that the movable arm of that switch connects the capacitor 454 to ground through the movable arm and left fixed contact of the switch 429 and through the switch 404b and the reset button 410. This causes the capacitor 454 to be discharged, and; when the carriage 104 is next released, the movable arm of the switch 210b is returned to the left-hand contact and a current flows through the established circuit to the terminals "P" and "N." This current also flows through a solenoid in the key punch and this solenoid operates when energized to prevent any information from being recorded in the column of the card 47 being presented for processing. In this way, the card being processed skips, either a predetermined number of columns or one column, depending upon whether the terminal "P" circuit or the terminal "N" is activated.

Likewise, a similar setting and release of the switch 210c by one of the stops 208 causes a current to flow through a duplicating solenoid in the key punch which causes information to be duplicated from a preceding information card onto the one being processed. Similar actuation of the switches 210d and 210e causes an alternate program on the master card in the key punch to be used, in one instance, and the information card being processed to be released from the key punch in the other instance. It is usual that, at the end of the processing of each information card, the switch 210e is engaged by a stop 208 so that the card may be released from the key punch.

With the described apparatus, therefore, and with the appropriate positioning of the stops 208 on the switch actuator bar 200, it is possible on any one information card to record sets of data set up manually on the keyboard of the adding machine on one or more fields; to skip portions or all of other fields; to cause still other fields to be automatically recorded by information duplicated from the preceding processed card; and to cause still other fields to be controlled in accordance with an alternate program. It is also possible to provide that the cards be released from the key punch at any desired point or position.

The switch 429 connects the right-hand terminals of the switches 210b, 210c, 210d and 210e to the positive terminal of the direct voltage source 64 whenever the carriage 104 is undergoing its reverse movement back to its reference position. If any of the switches 210b, 210c, 210d or 210e is actuated during such return movement, its movable arm is merely connected to the positive terminal of the source 64 so that its associated capacitor does not lose any of its charge. Therefore, there can be no current flow through the associated terminal on the key punch when the movable arms return to their left fixed contacts. This assures that none of the controls described above is initiated during the return movement of the carriage 104.

When the accounting machine 100 strikes a credit balance, and, as is known to the accounting machine art, the machine undergoes two complete cycles. On the second cycle, the accounting machine causes the racks 114 (FIGURE 1) to assume a position corresponding to the credit balance. The switch 425 is now closed. The closure of the switch 425 causes the credit balance relay winding 426 to be energized to close the switches 426a and 426aa.

The closure of the switch 426a forms a holding circuit for the relay winding 426, and the closure of the switch 426aa actuates the No. 11 interposer solenoid in the key punch. This actuation of the No. 11 key punch interposer solenoid causes the information card being processed to be appropriately marked to indicate that the corresponding field is a credit balance.

After the first cycle, the switch 425 opens so that the set of data corresponding to the credit balance may be fed to the key punch. At the termination of the credit balance field, and as in any other field, the reset relay winding 404 is energized to deenergize the solenoid windings 400, 412 and 416. Energizing the relay winding 404 causes the switch 404b to open to deenergize the credit balance relay winding 426.

When the operator has made an error in a particular number and wishes to remove that number from the sum being totalized in the accounting machine, the operator presses the reverse key 427 and repeats the erroneous number. This causes the machine to print the complement of the previous number set up so that the previous number is effectively deleted from the total. When the key 427 is closed, the relay winding 426 is energized so that the No. 11 interposer in the key punch may be actuated, as before, through the switch 426aa to indicate on the processed card that the corresponding field is actually complementary data corresponding to a credit balance or a number to be subtracted.

Therefore, and in the manner described above, the accounting machine of FIGURE 4 may be adapted conveniently to control the recording of data on succeeding information cards fed through a key punch such as the key punch 14 of FIGURE 1.

The accounting machine can be so adapted that the full travel of the carriage 104 represents the complete recordation of each one of the information cards. The stops 209 of FIGURE 10 are positioned on their bushings 205 in selected ones of the apertures 203 so that the carriage 104 is arrested at various positions to correspond to respective fields on the information card being processed. For each of these positions, a stop 209 actuates the switch 210a of FIGURE 13 which locks the movable members 120 in the adaptor 102, which brings the commutator 146 down on these members and which locks the carriage 104, these controls being effectuated in the manner described above. The placement of the stops 209 relative to the normal stops 110 of the accounting machine are such that each closure of the switch 210 by a stop 209 occurs after a number corresponding to a particular field has been set up by the keyboard 106 in the racks 114, and when the keyboard is freed so that the number for the next field may be set up. This action is similar to that of the apparatus described in the copending application and in conjunction with FIGURE 1.

The system has a high degree of flexibility in that, and in the manner described, certain of the stops 209 can be arranged to actuate selected ones of the switches 210b, 210c, 210d, 210e at selected positions of the carriage. Therefore, a stop may be arranged at a selected station to actuate the switch 210d so that an alternate program is used for the next succeeding field. Alternately, other stops can be arranged to actuate the switches such as the switch 210b both to provide a skip of any desired number of positions on the card being processed, or to actuate the switch 210c which provides that the next field on the card being processed will be a duplication of the corresponding field on the preceding card. Then, and at the end of the process, a stop 209 is arranged to actuate the switch 210e which causes the card being processed in the key punch to be released. In each instance, the selected one of the switches 210b, 210c, 210d, 210e is set when the carriage of the accounting machine reaches the station in question. Then, when the operator releases the carriage by depressing an appropriate key in the accounting machine, the automatic operation for the next field is initiated.

After the last operation described in the preceding paragraph, the carriage 104 is returned to its left hand position in FIGURE 4 by the usual accounting machine carriage return mechanism. The machine is now ready for the next card which is fed to the recorder and the recording process may now be repeated for that card. As noted above, during the return of the carriage, the switch 429 of FIGURE 13 is actuated so that operation of the switches 210a–210e by the stops during the return of the carriage will have no effect on the card in the key punch.

The system is also flexible in that it permits the operator to make a decision for any field on any card as to whether that field is to be punched with new data; or whether that field is to be skipped or whether it is to be a duplication of a field on a preceding card, and so on.

This latter feature may be achieved by arranging the stop 209 so that for selected fields, the switch 210a and a selected one of any of the other switches 210b, 210c, 210d and 210e are actuated.

Now when such a field is reached, the switch 210a is closed and, for example, the armature of the switch 210c is moved to engage its right-hand fixed contact. The capacitor 450, therefore, looses its charge through the path described above. Now, should the operator release the carriage of the accounting machine, the return of the armature of the switch 210c to its left-hand contact would cause the key punch to duplicate a field from the preceding card on the card being processed, this being carried out in the described manner.

However, should the operator desire to punch new data in the field under consideration, he may proceed to do so. While this new data is being set up, the carriage of the accounting machine is held in position so that the armature of the switch 210c is not released to its left hand contact. The automatic duplicating operation is, therefore, not initiated.

After the new data has been set up in the accounting machine for the field in question, and when the last column of the field is reached by the key punch, the relay 404 is energized as explained previously. This causes the switch 404b to open to remove the ground from the resistor 440, and this permits the capacitor 450 to regain its charge from the source 64. Therefore, when the carriage of the accounting machine is released, and the armature of the switch 210c is thereby returned to its left-hand contact, there is no actuation of the automatic duplicating control.

Therefore, at various positions of the carriage of the accounting machine, the system may be controlled to initiate automatic duplication, skip and other operations, as described above. For any of those positions, however, and as described in the immediately preceding paragraphs, the operator can override the automatic operations and record new data in the field in question.

The invention provides, therefore, an improved control system for a key punch or similar machine for recording data on information cards for use in data processing systems. In accordance with one embodiment of the present invention, the coupling system and circuit between the modified adding machine and the key punch is relatively simple in its construction and is under the control of an auxiliary star wheel control switch in the key punch itself.

Moreover, the invention provides a modified adaptation for a relatively complicated present day accounting machine. The adaptation of the invention is so conceived that the modifying components are, for the most part, housed in a separate unit that may be simply and conveniently attached to the accounting machine without disturbing its internal components.

Moreover, the improved adaptation of the present invention provides for a large measure of automatic controls of the cards being processed, and also provides a high degree of flexibility in the recording process.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. Apparatus for controlling the recording of data on an information storage card having a plurality of columns and for controlling such recording in accordance with coded information provided in successive columns on a control means to indicate the occurrence of different fields and the number of columns in each field and for controlling the recording of such information in accordance with information supplied by an accounting machine, including, means including a plurality of members responsive to the information supplied by the accounting machine to become positioned in accordance with such information, means operative upon the control means and the information card for initiating a sequential advance of the control means and the information card to successive columns, means responsive to each movement of the control means and the card to a successive column to obtain a recording of information in that column of the information card in accordance with the positioning of a particular one of the members and in accordance with the control information provided by the control means in that column of the control means, and means responsive to the recording of information in the different columns of each field on the information card for preparing the members for a positioning of the members for the recording of information in the different columns of the next field on the card in accordance with information from the accounting machine.

2. Apparatus for controlling the recording of data on an information storage card having a plurality of columns and for controlling such recording in accordance with coded information provided in successive columns on a control means to indicate the occurrence of different fields and the number of columns in each field and for controlling the recording of such information in accordance with information supplied by an accounting machine, including, means including a plurality of members movable to different positions in accordance with the information supplied by the accounting machine, means responsive to the positioning of the members in accordance with information supplied by the accounting machine to obtain a recording of information in the different columns for a particular field on the information card in accordance with the positioning of the different members and in accordance with the control information provided by the control means in successive columns on the control means, means responsive to the recording of information for each column for a particular column on the card to initiate an advance of the control means and the information card to the next column on the control means and the information storage card, means responsive to the recording on the card of information in the different columns of the particular field to prepare the members for disposition to obtain the recording of information in the different columns in the next field on the card, and means coupled to the accounting machine and responsive to the beginning of the next particular field for obtaining a rapid advance of the card and the control means through successive columns of the next particular field without obtaining any recording of information in such columns on the card.

3. The apparatus set forth in claim 2 in which the control means constitutes a second card having control information recorded in the different columns on the card and in which means are included in the accounting machine to control a skipping operation.

4. Apparatus for controlling the recording of data on an information storage card having a plurality of columns and for controlling such recording in accordance with coded information provided in successive columns on a control means to indicate the occurrence of different fields and the number of columns in each field and for controlling the recording of such information in accordance with information supplied by an accounting machine and by a preceding card, including, means including a plurality of members movable to different positions in accordance with the information provided by the accounting machine, means operative upon the control means and the information storage card for initiating a concurrent advance of the card and the control means to successive columns on the card, means responsive to each advance of the control means and the information storage card to a successive column for a particular field to obtain the recording of information in that column on the card in accordance with the positioning of an individual one of the members and in accordance with the control information provided by the control means in that column of the control means, means responsive to the recording on the card of information in the different columns of the particular field for preparing the members in the plurality for disposition in representation of information for the next particular field on the card, and means responsive to the recording on the card of information in the different columns of the particular field and coupled to the accounting machine for obtaining the duplicating on the card of information in the successive columns of the next particular field from a corresponding field on the preceding card.

5. The apparatus set forth in claim 4 in which the control means constitutes a second card having control information recorded in the different columns on the card and in which means are included in the accounting machine to control a duplicating operation.

6. Apparatus for controlling the recording of data on an information storage card having a plurality of columns in accordance with information coded on a second card to indicate the occurrence of different fields and to indicate the number of columns in each field and for controlling the recording of such information in accordance with information supplied by an accounting machine, including, a plurality of members positionable in accordance with the information supplied by the accounting machine, means operatively coupled to the members for holding the members in fixed positioning upon the positioning of the members, means operative upon the first and second cards for instituting a sequential stepping of the first and second card in synchronism between the successive columns in each field on the second card, means coupled to the members and controlled by the stepping means for activating the different members in accordance with the information on the second card and for obtaining a recording of the information on the first card in accordance with the positioning of the different members upon the activation of the members, and means controlled by the information coded on the second card in representation of the end of a field for obtaining a release of the members upon the recording on the first card of the information for the different columns in the field.

7. Apparatus for controlling the recording of data on an information storage card having a plurality of columns in accordance with information coded on a second card to indicate the occurrence of different fields and to indicate the number of columns in each field and for controlling the recording of such information in accordance with information supplied by an accounting machine, including, positioning means operatively coupled to the accounting machine to become positioned in accordance with the information supplied by the accounting machine, means operatively coupled to the positioning means for fixedly retaining such means upon the movement of the positioning means from their initial disposition, means for obtaining a selection of the particular positioning means for each column on the first card in accordance with the information coded into the corresponding column on the second card, means operatively coupled to the selected positioning means for obtaining a recording of an indication in each column on the information storage card in accordance with the disposition of the selected positioning means, means operative upon the first and second cards for instituting an advance of the first and second cards to the next column upon the recording of information in the previous column of the first card, and means operative upon the second card for obtaining a release of the positioning means upon an indication on the second card as to the end of a field.

8. Apparatus for controlling the recording of data on an information storage card having a plurality of columns in accordance with information coded on a second card to indicate the occurrence of different fields and to indicate the number of columns in each field and for controlling the recording of such information in accordance with information supplied by an accounting machine, including, means including a plurality of movable means operatively coupled to the accounting machine to become positioned in accordance with information obtained from the accounting machine and to remain fixed in such positioning until the recording on the first card of the information represented by the position of the movable means, a plurality of switches each disposed relative to the second card for actuation in accordance with the recording of different bits of information in the columns on the second card, electrical circuitry including the switches and coupled to the movable means for obtaining an activation of different ones of the movable means in accordance with the actuation of the different switches and for obtaining a recording of information in the columns on the first card in accordance with the positioning of the activated movable means, means operative upon the first and second cards for initiating a synchronized advance of the first and second cards to successive columns on the cards upon the recording of information in the preceding columns on the first card, and means operatively coupled to the movable means for obtaining a release of the movable means upon the recording on the first card of the information on the different columns constituting the field being represented on the second card.

9. Apparatus for controlling the recording of data on an information storage card having a plurality of columns in accordance with information coded on a second card to indicate the occurrence of different fields and to indicate the number of columns in each field and for controlling the recording of such information in accordance with information supplied by an accounting machine, including, a commutator having a plurality of conductive strips corresponding to the different information capable of being recorded in each column on the first card, a plurality of means movable into different positions in accordance with the information supplied by the accounting machine and including a plurality of brushes carried by the movable means for establishing electrical continuity with the conductive strips on the commutator, means operatively coupled to the commutator for moving the commutator into contact with the brushes on the movable means at the beginning of a field on the second card, means including electrical circuitry and including the brushes and including the commutator for energizing different ones of the brushes in accordance with the indications on the second card and for energizing different ones of the conductive strips in accordance with the positioning of the energized brush to obtain a recording of the information represented by the positioning of the energized brush, and means operative upon the first and second cards for initiating an advance of the first and second cards to the next field upon the recording of information on the first card in the previous field.

10. Apparatus as set forth in claim 9, including means operatively coupled to the movable means for maintaining the movable means in fixed position during the recording of information in each field, and means operatively coupled to the movable means for obtaining a release of the movable means upon the recording on the first card of the information in the columns representing the field being presented for the processing of data.

11. Apparatus for controlling the recording of data on an information storage card having a plurality of columns in accordance with information coded on a second card to indicate the occurrence of different fields and to indicate the number of columns in each field and for controlling the recording of such information in accordance with information supplied by an accounting machine, including, means operative upon the first and second cards for controlling the movements of the first and second cards to synchronize the presentation of successive columns and fields on the cards upon the recording of information in the columns on the first card, first switching means operative upon the movement of the cards from one column to the next to provide a control preventing the recording of any information on the first card until the completion of any movement, means operatively coupled to the accounting machine for movement in accordance with the information supplied by the accounting machine for a new field and upon the completion of the recording of the information for the previous field, means operatively coupled to the movable means for obtaining a retention of the movable means in fixed position until the completion of the recording of the information for the field represented by such positioning, a plurality of second switching means each responsive to different coded information in the columns on the second card to become activated and coupled to a different one of the movable means, electrical means including the first switching means and the second switching means for obtaining a recording of information in the columns on the first card in accordance with the particular one of the second switching means to be activated and in accordance with the positioning of the activated movable means, and means responsive to indications on the second card representing the end of a field to obtain an actuation of the second switching means for the release of the movable means from the positions representing the information supplied by the accounting machine.

12. Apparatus for controlling the recording of data on an information storage card having a plurality of columns in accordance with information coded on a second card to indicate the occurrence of different fields and to indicate the number of columns in each field and for controlling the recording of such information in accordance with information supplied by an accounting machine, including, a plurality of means positionable in accordance with information supplied by the accounting machine, a plurality of first switches each operable in accordance with different information coded into the columns of the second card, a first particular one of the first switches being operable in accordance with coding provided on the second card to indicate the end of a field, a second particular one of the first switches being actuatable in accordance with coding provided on the second card to indicate the continuance of a particular field upon the initiation of the field, a plurality of brushes each movable with a different one of the positionable means for positioning in accordance with the movement of the positionable means, each of the brushes being connected in a circuit with a different one of the switches for energizing of the brush upon the actuation of the switch, means including the brushes and including the second particular one of the first switches and disposed relative to the first card for obtaining a recording in the columns on the first card in accordance with the particular brushes energized and with the positioning of the brushes, means operative upon the first and second cards for initiating an advance of the first and second cards on a synchronous basis to successive columns upon the recording of information in the previous columns on the first card, means operatively coupled to the positionable means for retaining the positionable means in fixed positioning during the recording of information in the columns of each field, and means including the first particular one of the first switches and operatively coupled to the retaining means for obtaining a release of the retaining means at the end of each field to obtain a return of the positionable means to their initial positions for subsequent positioning of such means in accordance with information to be recorded on the first card for the next field.

13. Apparatus for controlling the recording of data on an information storage card having a plurality of columns in accordance with information coded on a second card to indicate the occurrence of different fields and to indicate the number of columns in each field and for controlling the recording of such information in accordance with information supplied by an accounting machine, including, means including a plurality of racks positionable in accordance with information supplied by the accounting machine and including a plurality of brushes movable with the racks, a commutator having a plurality of conductive strips each representing different information, a plurality of switches each actuatable in accordance with different information coded into the columns on the second card and each connected in electrical circuitry with the different brushes to energize the brushes in a particular relationship, a particular one of the switches being actuatable in accordance with information coded on the second card to represent the end of a field, means operatively coupled to the racks for retaining the racks in fixed positioning during the recording of information in the columns on the first card for a particular field, means for positioning the commutator relative to the brushes to obtain a conductivity of the different strips in accordance with the positioning of the energized brushes, means including the switches in the first plurality and including the brushes and including the conductive strips on the commutator for obtaining a recording of information in the columns on the first card in accordance with the positioning of the energized brushes, means disposed relative to the first and second cards for initiating a synchronous advance of the first and second cards from each column to the next upon the recording of information in the first column on the first card, and means including the particular one of the switches in the first plurality and operatively coupled to the retaining means for operating upon the retaining means to obtain a release of the racks and the commutator upon the completion of the recording in the columns on the first card of the information for a field as indicated in the columns on the second card.

14. Apparatus for controlling the recording of data on a first information storage card having a plurality of columns in accordance with coded information provided on a control means to indicate the occurrence of different fields and the number of columns in each field and for controlling the recording of such information in accordance with information supplied by an accounting machine, including, a plurality of members movable to different positions in accordance with the information supplied by the accounting machine, means operatively coupled to the movable members for holding the movable members in fixed positioning upon the positioning of the members, means operative upon the first card and the control means for obtaining a sequential stepping of the first card and the control means in synchronism between the successive columns in each field on the control means, means operatively coupled to the movable members and controlled by the stepping means for obtaining the activation of the different movable members in accordance with the information on the control means and for obtaining a recording of the information on the first card in accordance with the positioning of the activated movable member, means controlled by the information coded on the control means to represent the end of a field for obtaining a release of the movable members upon the recording on the first card of the information for the different columns in the field on the control means, means for initiating the movement of the movable members into proper positioning for the next field upon the recording of the information on the first card for the previous field and for initiating a stepping of the first card and the control means into the first column of such field for the recording of information on the first card, and means including switching means coupled to the accounting machine for controlling the duplication on a second card of the information recorded from the accounting machine on at least certain fields of the first card.

15. Apparatus for controlling the recording of data on an information storage card having a plurality of columns in accordance with coded information provided on a control means to indicate the occurrence of different fields and the number of columns in each field and for controlling the recording of such information in accordance with information supplied by an accounting machine, including, a plurality of positioning means operatively coupled to the accounting machine to become positioned in accordance with the information supplied by the accounting machine, means operatively coupled to the positioning means for fixedly retaining such means upon the movement of the positioning means from their initial disposition, means operatively coupled to the control means for obtaining an activation of the particular positioning means for each column on the card in accordance with the information coded into the corresponding column of the control means, means operatively coupled to the positioning means for obtaining a recording of an indication in each column on the card in accordance with the disposition of the activated positioning means, means for obtaining a recording on selected columns of the card as to certain additional information qualifying the information recorded in these columns of the card to indicate that this information has a distinctive meaning, means operative upon the card and the control means for initiating an advance of the card and the control means to the next column upon the recording of information in the previous column of the card, and means operatively coupled to the retaining means for operating upon the retaining means to obtain a release of the positioning means upon an indication in the control means as to the end of a field.

16. Apparatus for controlling the recording of data on an information storage card having a plurality of columns in accordance with coded information provided on a control means to indicate the occurrence of different fields and the number of columns in each field and for controlling the recording of such information in accordance with information supplied by an accounting machine, including, means including a plurality of movable means operatively coupled to the accounting machine to become positioned in accordance with information obtained from the accounting machine and to be retained in such positioning until the recording on the first card of the information represented by the positioning of the movable means, a plurality of switches each disposed relative to the second card for actuation in accordance with the recording of the control information in the control means, electrical circuitry including the switches and coupled to the movable means for obtaining an activation of different ones of the movable means in accordance with the actuation of the different switches and for obtaining a recording of information in the different columns on the card in accordance with the positioning of the activated movable means, means operative upon the card and the control means for initiating a synchronized advance of the card and the control means to successive columns upon the recording of information in the preceding column on the card, means including switching means operatively coupled to the accounting machine for obtaining an advance of the card and the control means past certain columns without the recording of any information in these columns and even with the inclusion of control information in these columns on the control means, means for obtaining a release of the movable means upon an advance of the card and the control means to the end of the field being presented on the control means, and means for releasing the card upon an advance of the end of the card.

17. Apparatus as set forth in claim 7, including, means including switching means operatively coupled to the accounting machine for providing certain controls to obtain a flexibility in the recording of information on the first card including the skipping of certain columns from the recording of information in these columns on the first card, the duplication of information in at least certain fields from information recorded in corresponding fields of a preceding one of the first cards and the release of the first card after the recording of information on the first card in only a certain number of columns less than the complete number of columns on the card.

18. Apparatus for controlling the recording of data on an information card and constructed to be mounted on a mechanism which includes a plurality of racks adapted to be shifted to different individual positions corresponding to a set of data to be recorded on the card, said apparatus including a plurality of members disposed relative to the racks for actuation by the racks and for shifting by the racks from a reference position to different individual positions corresponding to the set of data to be recorded on the card, first solenoid controlled means operatively coupled to the members for locking said members in said different positions, a corresponding plurality of electrically conductive brushes respectively movable with said members, a commutator for selectively establishing electrical connections with said brushes in accordance with the individual positions of said members, resilient means operatively coupled to said commutator for biasing said commutator to a position out of contact with said brushes, and second solenoid controlled means operatively coupled to said commutator for bringing said commutator into contact with said brushes after said members are locked in said different positions by said first solenoid controlled means.

19. Apparatus for controlling the recordation of data on an information card including, a plurality of movable members constructed to be shifted from a reference position to different individual positions corresponding to a set of data to be recorded on the cards, first solenoid controlled means operatively coupled to the movable members for locking said movable members in said different positions, a plurality of electrically conductive brush members respectively mounted on said movable members, a commutator for selectively establishing electrical connections with said brush members in accordance with the individual positions of said movable members, resilient means operatively coupled to the commutator for biasing said commutator to a position out of contact with said brush members, and second solenoid controlled means operatively coupled to the commutator for bringing said commutator into contact with said brush members.

20. Apparatus for controlling a recording mechanism to cause data to be recorded on an information card fed through such mechanism in accordance with controls provided by a control card, which recording mechanism includes a plurality of electrically controlled individually actuatable recording control elements having a common return circuit, said apparatus including a plurality of members disposed to be shifted from a reference position to different individual positions corresponding to a set of data to be recorded on the card, a plurality of electrical contact brushes respectively movable with said members, commutator means movable between an inoperative position and an operative position for individually connecting said contact brushes to particular ones of the recording control elements in accordance with the individual positions of said members, means operative upon the control card and the information card for obtaining the transport of the control card in synchronism with the movement of the information card through the recording mechanism, a set of movable contacts engaging said control card and actuated thereby, a set of fixed contacts disposed to be successively engaged by corresponding ones of said movable contacts under the control of said control card, one of said set of contacts being respectively connected to said brushes and the other of said set of contacts being connected to the common return circuit of the recording control elements, an additional movable contact engaging said control card, an additional fixed contact disposed to be engaged by said additional movable contact at the termination of the recording of the set of data on the information card, and a control means actuated by the engagement of said additional contacts to move said commutator means to its inoperative position and to enable said members to be returned to their reference position.

21. The apparatus defined in claim 20 and which includes switch means connected to the common return circuit of the recording control elements, and means responsive to the movement of said commutator means for actuating said last named switch means to close the common return circuit when said commutator means is moved to its operative position.

References Cited in the file of this patent

UNITED STATES PATENTS

| | | |
|---|---|---|
| 2,569,805 | Doty et al. | Oct. 2, 1951 |
| 2,684,719 | Johnson et al. | July 27, 1954 |
| 2,756,823 | Laville et al. | July 31, 1956 |
| 2,765,849 | Gollwitzer | Oct. 9, 1956 |